United States Patent
Burns

(10) Patent No.: US 12,217,353 B2
(45) Date of Patent: *Feb. 4, 2025

(54) QUANTIZED RAY INTERSECTION TESTING WITH DEFINITIVE HIT DETECTION

(71) Applicant: Apple Inc., Cupertino, CA (US)

(72) Inventor: Christopher A. Burns, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,548

(22) Filed: Oct. 19, 2023

(65) Prior Publication Data

US 2024/0046550 A1    Feb. 8, 2024

Related U.S. Application Data

(63) Continuation of application No. 17/456,503, filed on Nov. 24, 2021, now Pat. No. 11,830,124.

(Continued)

(51) Int. Cl.
*G06T 15/06* (2011.01)
*G06T 15/50* (2011.01)

(52) U.S. Cl.
CPC ............ *G06T 15/06* (2013.01); *G06T 15/506* (2013.01); *G06T 2215/12* (2013.01)

(58) Field of Classification Search
None
See application file for complete search history.

(56) References Cited

U.S. PATENT DOCUMENTS

| 8,217,935 | B2 | 7/2012 | Purcell et al. |
| 10,825,230 | B2 | 11/2020 | Laine et al. |

(Continued)

FOREIGN PATENT DOCUMENTS

| CN | 101192310 A | 6/2008 |
| CN | 103593817 A | 2/2014 |

(Continued)

OTHER PUBLICATIONS

Notice of Allowance in Chinese Appl. No. 2022111132668 mailed Oct. 16, 2023, 10 pages.

(Continued)

*Primary Examiner* — Nurun Flora
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to intersection tests for ray tracing in graphics processors. In some embodiments, test circuitry is configured to perform an intersection test based on traversal of an acceleration data structure that includes hierarchically-arranged bounding volumes for a graphics scene, where the test operates on: reduced-precision representations of rays that are quantized versions of initial representations of the rays and reduced-representatives of primitives that are quantized versions of initial representations of the primitives. The test may generate a first result for a first ray and a first primitive that indicates that a line coincident with the first ray definitively intersects the first primitive. The graphics processor may record an intersection for the first ray with the first primitive, based on the first result, without performing an intersection test for the first ray using the initial representation of the first ray and the first primitive.

20 Claims, 18 Drawing Sheets

Related U.S. Application Data

(60) Provisional application No. 63/248,143, filed on Sep. 24, 2021.

(56) References Cited

U.S. PATENT DOCUMENTS

| | | | |
|---|---|---|---|
| 10,970,914 | B1 | 4/2021 | Clark et al. |
| 2019/0180497 | A1 | 6/2019 | Bakalash |
| 2020/0051314 | A1* | 2/2020 | Laine .................... G06T 15/005 |
| 2020/0264888 | A1* | 8/2020 | Limaye ............... G06F 12/0895 |
| 2020/0320776 | A1 | 10/2020 | Doyle et al. |
| 2021/0097750 | A1 | 4/2021 | Woop et al. |
| 2021/0192829 | A1 | 6/2021 | Clark et al. |
| 2021/0287428 | A1* | 9/2021 | Woop ...................... G06T 15/06 |

FOREIGN PATENT DOCUMENTS

| | | |
|---|---|---|
| CN | 109087384 A | 12/2018 |
| CN | 109509138 A | 3/2019 |
| CN | 111383159 A | 7/2020 |
| CN | 112907711 A | 6/2021 |
| CN | 112907717 A | 6/2021 |
| GB | 2584187 A | 11/2020 |
| TW | 201638883 A | 11/2016 |
| WO | 2007/081303 A1 | 7/2007 |

OTHER PUBLICATIONS

Office Action in Korean Patent Application No. 10-2022-0115377 mailed Nov. 6, 2023, 5 pages.
Search Report in UK Patent Application No. 2212912.6 mailed Mar. 6, 2023, 4 pages.
Office Action in Taiwanese Appl. No. 111134755 mailed Mar. 22, 2023, 7 pages.
Office Action in U.S. Appl. No. 17/456,483 mailed Feb. 2, 2023, 10 pages.
Jae-Ho Nah and Dinesh Manocha, "SATO: Surface Area Traversal Order for Shadow Ray Tracing," Computer Graphics forum, University of North Carolina at Chapel Hill, NC, vol. 00 (2014), No. 00 pp. 1-11.

* cited by examiner

*Example interval representations*

Per quantized vertex position:

| x lower bound | x upper bound |
|---|---|
| y lower bound | y upper bound |
| z lower bound | z upper bound |

Ray origin

| x lower bound | x upper bound |
|---|---|
| y lower bound | y upper bound |
| z lower bound | z upper bound |

Ray direction

| x lower bound | x upper bound |
|---|---|
| y lower bound | y upper bound |
| z lower bound | z upper bound |

Ray time

| t lower bound | t upper bound |
|---|---|

Shear factors (calculated based on ray direction):

| dx/dz lower bound | dx/dz upper bound |
|---|---|
| dy/dz lower bound | dy/dz upper bound |

Interpolated triangle vertex, covers possible triangle positions within ray time interval. Calculated based on ray time and the starting and ending positions of a moving triangle:

| x lower bound | x upper bound |
|---|---|
| y lower bound | y upper bound |
| z lower bound | z upper bound |

*FIG. 3*

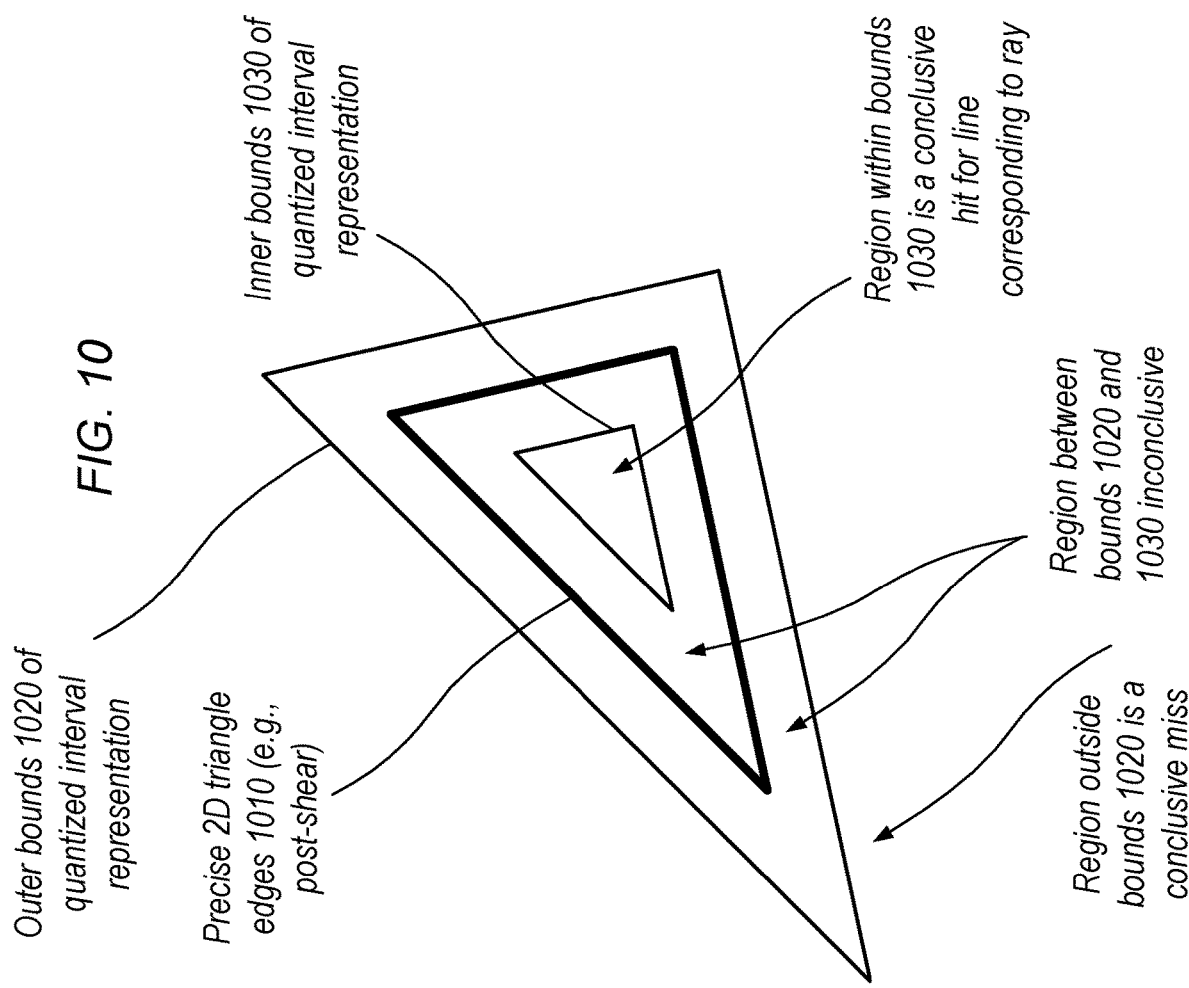

Quantize a first representation of a primitive to generate a reduced-precision interval representation of the primitive, wherein the interval representation includes interval values that are guaranteed to cover corresponding values specified by the first representation of the primitive
1410

Quantize a first representation of a ray to generate a reduced-precision interval representation of the ray, wherein the interval representation includes interval values that are guaranteed to cover corresponding values specified by the first representation of the ray
1420

Determine, using interval arithmetic, an initial intersection result based on coordinates of the interval representation of the primitive with coordinates of the interval representation of the ray, wherein a miss indicated by the initial intersection result is guaranteed not to be a hit for the first representation of the primitive and first representation of the ray
1430

*FIG. 14*

Perform intersection tests, wherein the intersection tests operate on reduced-precision representations of rays that were generated by quantizing initial representations of the rays and reduced-representatives of primitives that were generated by quantizing initial representations of the primitives, wherein the intersection tests generate a first result for a first ray and a first primitive that indicates that a line coincident with the first ray definitively intersects the first primitive
1510

Record an intersection with the first primitive for the first ray based on the first result, without performing an intersection test for the first ray using the initial representation of the first ray and the first primitive based on:
- the first result;
- a determination that the first primitive is opaque
- a determination that there is at least one bounding volume in the acceleration data structure that encloses the entirety of the first primitive and for which the entirety of the enclosed portion of the first ray is active
1520

FIG. 15

QUANTIZED RAY INTERSECTION TESTING WITH DEFINITIVE HIT DETECTION

The present application is a continuation of U.S. application Ser. No. 17/456,503, entitled "Quantized Ray Intersection Testing with Definitive Hit Detection," filed Nov. 24, 2021, which claims priority to U.S. Provisional App. No. 63/248,143, entitled "Ray Intersection Testing with Quantization and Interval Representations," filed Sep. 24, 2021; the disclosures of each of the above-referenced applications are incorporated by reference herein in their entireties.

BACKGROUND

Technical Field

This disclosure relates generally to graphics processors and more particularly to primitive intersection testing for ray tracing.

Description of the Related Art

In computer graphics, ray tracing is a rendering technique for generating an image by tracing the path of light as pixels in an image plane and simulating the effects of its encounters with virtual objects. Ray tracing may allow resolution of visibility in three dimensions between any two points in the scene, which is also the source of most of its computational expense. A typical ray tracer samples paths of light through the scene in the reverse direction of light propagation, starting from the camera and propagating into the scene, rather than from the light sources (this is sometimes referred to as "backward ray tracing"). Starting from the camera has the benefit of only tracing rays which are visible to the camera. This system can model a rasterizer, in which rays simply stop at the first surface and invoke a shader (analogous to a fragment shader) to compute a color. More commonly secondary effects—in which the exchange of illumination between scene elements, such as diffuse inter-reflection and transmission—are also modeled. Shaders that evaluate surface reflective properties may invoke further intersection queries (e.g., generate new rays) to capture incoming illumination from other surfaces. This recursive process has many formulations, but is commonly referred to as path tracing.

Graphics processors that implement ray tracing typically provide more realistic scenes and lighting effects, relative to traditional rasterization systems. Ray tracing is typically computationally expensive, however. Improvements to ray tracing techniques may improve realism in graphics scenes, improve performance (e.g., allow tracing of more rays per frame, tracing in more complex scenes, or both), reduce power consumption (which may be particularly important in battery-powered devices), etc.

Ray intersection queries may be performed by shaders, by dedicated hardware, or by a combination of the two. Different types of intersection queries may provide different types of information. For example, a "closest hit" query may locate the nearest intersected geometry along a ray and within the parametric interval in which the ray is valid (this may be the most common type of query). An "any hit" query may indicate whether there is any intersected geometry along the ray and within the parametric interval. This type of query may be used for shadow rays, for example, to determine whether a point in the scene has visibility to the light or is occluded. Once intersected geometry has been determined, that geometry may be shaded based on the intersections, and may in turn generate more rays for intersection testing, e.g., from reflective surfaces.

Motion blur is a phenomenon that occurs when the image being recorded changes during recording of a single exposure. For example, a photograph of a moving freight train with a sufficiently long exposure time may show the train blurred while non-moving objects are non-blurred. In the computer graphics context, a graphics processor may simulate the motion blur effect for a frame of graphics data. In this context, an animated graphics primitive (e.g., a triangle) may be modeled with multiple different positions during an open shutter interval of a virtual camera (also referred to herein as a motion blur interval), and thus may affect pixel values at the multiple positions in the frame to cause a blurring effect.

Each ray is typically assigned a precise time stamp, e.g., within a motion blur interval. When implementing both ray tracing and motion blur, testing for ray/primitive intersection may be expensive in terms of processor resources and power consumption.

BRIEF DESCRIPTION OF THE DRAWINGS

FIG. 3 is a diagram illustrating example interval representations for various values used in an initial intersection test, according to some embodiments.

FIG. 10 is a diagram illustrating example bounds of a quantized primitive representation and a region for a conclusive hit, according to some embodiments.

FIG. 11 is a diagram illustrating example test circuitry configured to generate a hit or inconclusive output, according to some embodiments.

FIG. 14 is a flow diagram illustrating an example method, according to some embodiments.

FIG. 15 is a flow diagram illustrating another example method, according to some embodiments.

DETAILED DESCRIPTION

In disclosed embodiments, a lower-precision hardware triangle test is performed first as a filter and a higher-precision triangle test is performed if the lower precision test determines a potential hit. This low-precision test may be conservative (e.g., it can generate false hits but should not generate false misses). U.S. patent application Ser. No. 17/136,542, filed Dec. 29, 2020 and titled "Primitive Testing for Ray Intersection at Multiple Precisions" is incorporated by reference herein in its entirety. The '542 application describes example techniques with tests at different precisions and how potential error due to quantization of inputs may be tracked throughout the reduced-precision test to ensure that the results are conservative.

The present disclosure uses interval arithmetic to track and bound potential quantization errors for a hardware primitive test that uses quantization of one or more inputs. In some embodiments, the disclosed techniques may advantageously provide tighter error bounds than embodiments of the '542 application. Further, disclosed techniques may use reduced circuit area to perform primitive tests at a particular precision, in some implementations.

Further, disclosed embodiments discussed in detail below generate an interpolated spatial coordinate interval to represent a moving triangle for a conservative intersection test for a given ray time in a motion blur interval. Further, disclosed techniques provide an efficient encoding and processing techniques for moving and non-moving triangle pairs.

Still further, disclosed techniques may provide definitive hit results using a lower-precision intersection test, without performing an intersection test at the original precision (e.g., for "any-hit" rays).

Finally, disclosed traversal ordering techniques for an acceleration data structure (e.g., "middle-out" ordering instead of front-to-back or back-to-front) may improve performance, reduce power consumption, or both, for traversals for certain types of rays.

Graphics Processing Overview

Figure 1A:
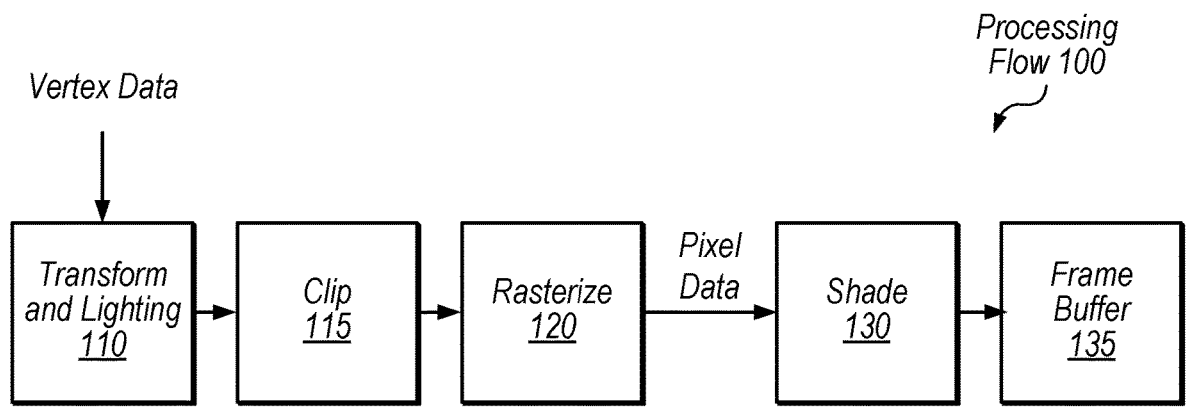
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
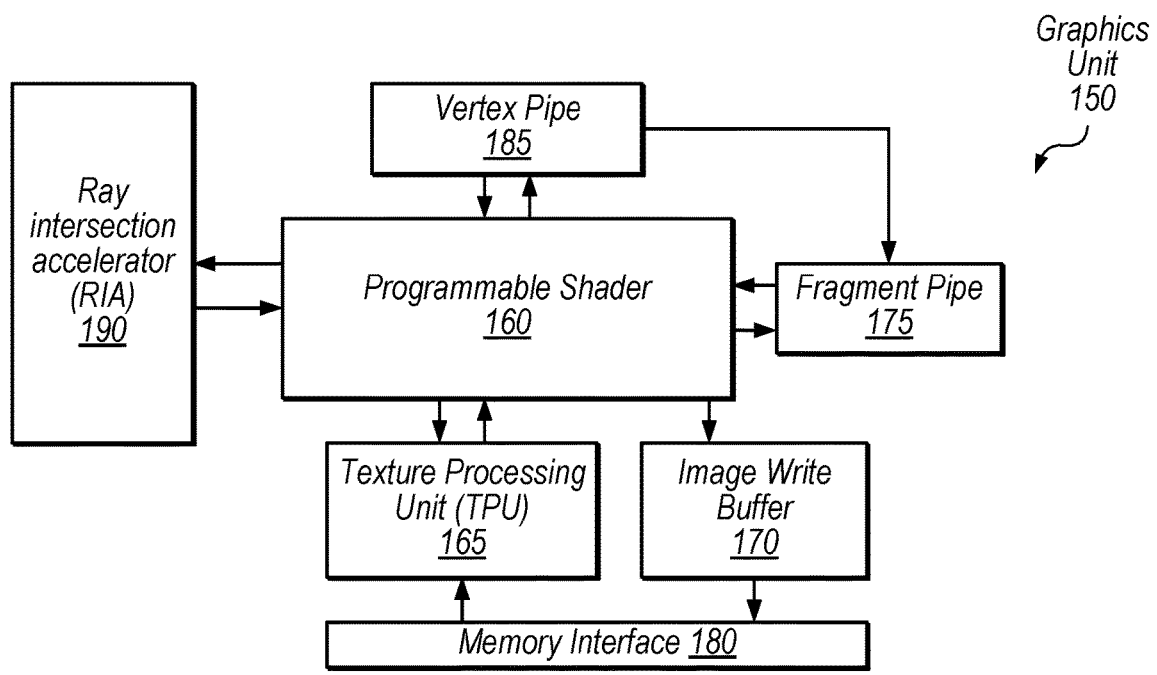
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In the illustrated example, graphics unit 150 includes ray intersection accelerator (RIA) 190, which may include hardware configured to perform various ray intersection operations, as described in detail below.

Overview of Interval-Based Intersection Test

Figure 2A:
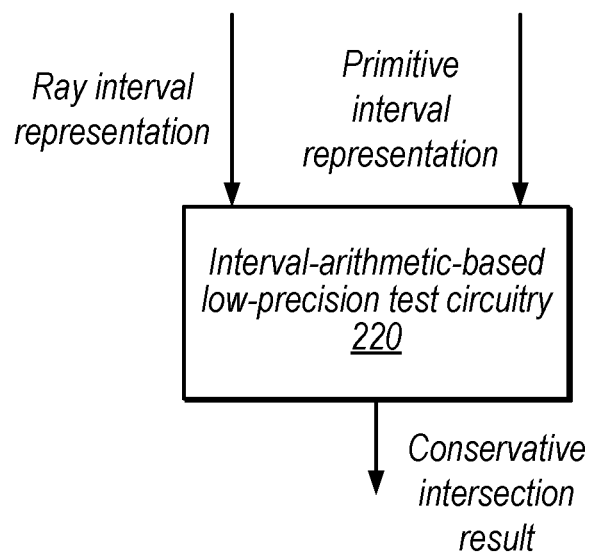
FIG. 2A is a block diagram illustrating example low-precision test circuitry, according to some embodiments.

FIG. 2A is a block diagram illustrating example quantization circuitry and low-precision intersection test circuitry, according to some embodiments. In the illustrated embodiment, a graphics processor includes test circuitry 220.

In some embodiments, quantization circuitry is configured to quantize ray data and generate interval representations of quantized values. In various embodiments, while the upper and lower bounds of the generated intervals are represented using a lower precision than the input representation, the interval is guaranteed to cover the initial value in the input precision. Note that primitive data may also be stored in a quantized interval format (e.g., in an acceleration data structure).

Interval-arithmetic-based low-precision test circuitry 220, in the illustrated embodiment, is configured to generate a conservative intersection result by performing interval arithmetic on the interval representations. The conservative intersection result may guarantee that a miss signaled by circuitry 220 will not result in a hit for a higher-precision intersection test (e.g., operating on values at the input precision prior to quantization). A positive output from circuitry 220 indicates a potential hit, in these embodiments.

In various embodiments, performing lower-precision initial intersection tests may advantageously improve performance, reduce power consumption, or both, relative to traditional techniques. In particular, misses or definitive hits generated by the initial test may avoid a need to perform a higher-precision test for a given ray and primitive. Therefore, both improving the accuracy of the test (e.g., by tightening the error bounds) and improving the performance or power consumption of the initial test itself may have technical advantages.

Figure 2B:
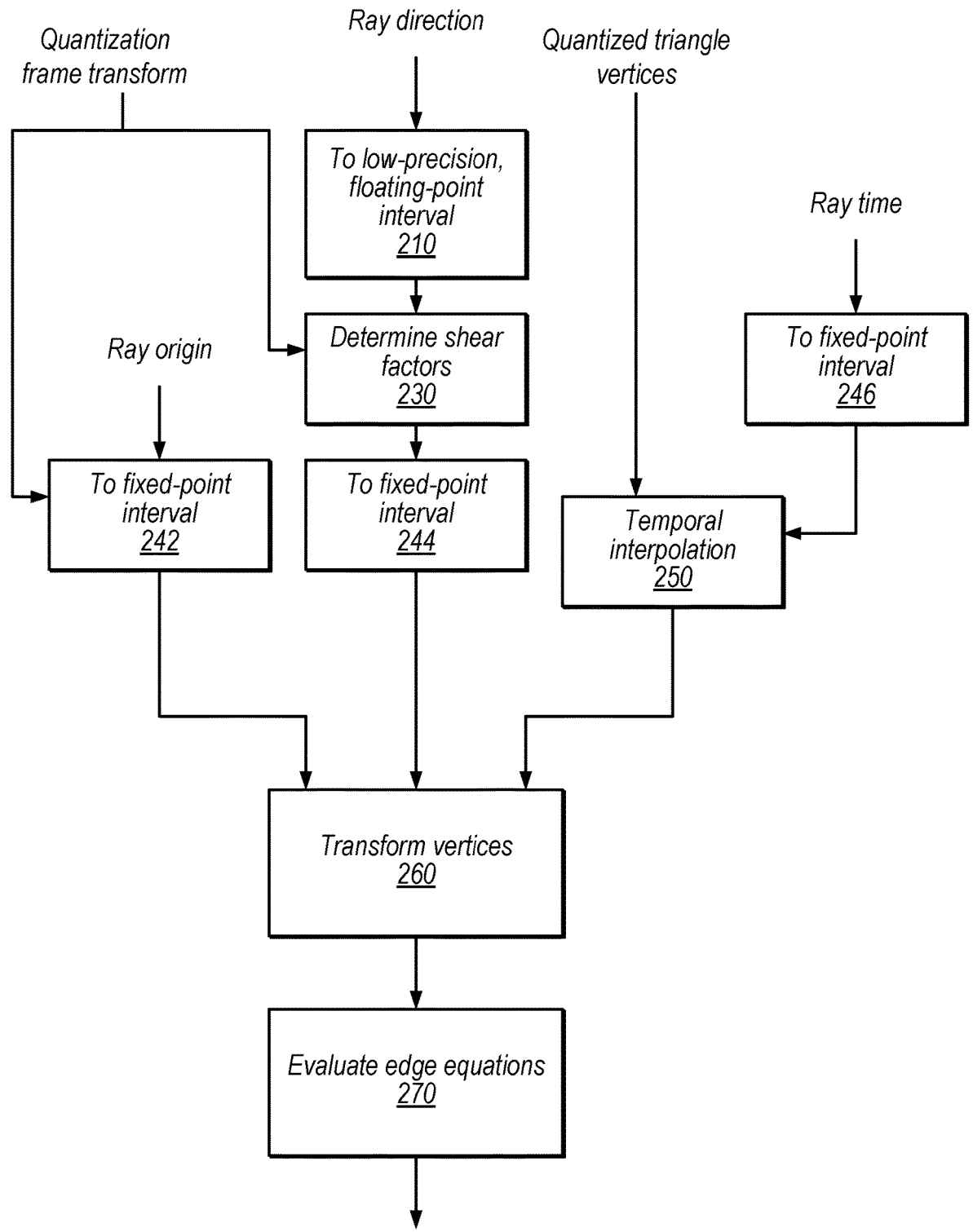
FIG. 2B is a block diagram illustrating an example intersection test technique, according to some embodiments.

FIG. 2B is a flow diagram illustrating an overall example intersection test technique, according to some embodiments. In the illustrated embodiment, element 210 converts the ray direction to a lower-precision, floating-point interval representation. Element 230 determines shear factors based on a quantization frame transform (used for quantization of vertices, as discussed in detail below below) and element 244 converts the shear factors to a fixed-point interval representation. Element 242 generates a fixed-point interval representation for the ray origin, also based on the quantization frame transform. Element 246 generates a fixed-point interval representation of the ray time. For motion blur processing, element 250 temporally interpolates quantized triangle vertices based on the ray time (this element may be omitted or may directly pass the quantized triangle vertices when not performing motion blur operations). Element 260 transforms the vertices according to the shear factors and ray origin and element 270 evaluates edge equations to determine whether there is a miss or a potential hit. Various elements of FIG. 2B are explained in further detail below. The specific operations of FIG. 2B are included for purposes of illustration and are not intended to limit the scope of the present disclosure. In some embodiments, however, the disclosed operations may advantageously provide tight intervals using reasonable circuit area and power consumption.

Example Quantized Interval Representations of Intersection Test Values

FIG. 3 is a diagram illustrating example interval representations for various values used in an initial intersection test, according to some embodiments. In the illustrated example, intervals are generated for vertex positions, ray origin, direction, and time, shear factors, and interpolated triangle vertices. Note that these specific intervals values are discussed for purposes of illustration, but are not intended to limit the scope of the present disclosure. In other embodiments, any of various values used in determining an initial intersection result may be represented using intervals.

In the illustrated embodiment, for each quantized vertex position (e.g., for each of three vertices of a triangle) three respective intervals are determined, for the X dimension, Y dimension, and Z dimension. Similar intervals are determined for the ray origin and ray direction. An upper and lower bound for the ray time is also determined in some embodiments that support motion blur.

In some embodiments that use shearing as part of the ray-triangle intersection test, upper and lower bounds are determined for two shear factors in the non-dominant coordinate directions for the ray.

Figure 4:
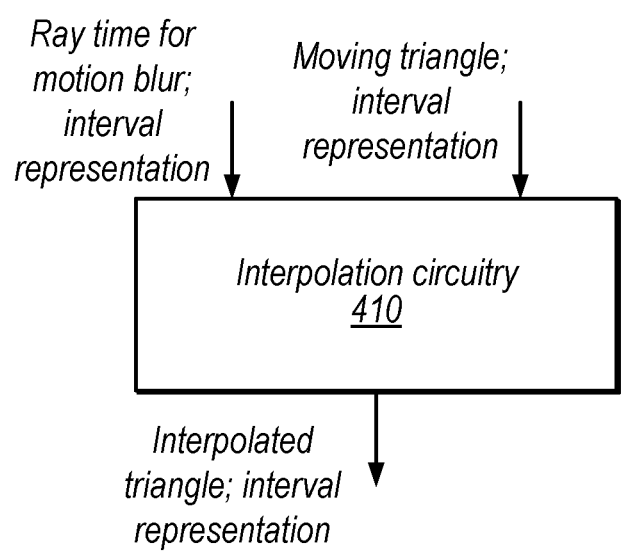
FIG. 4 is a diagram illustrating example interpolation circuitry configured to generate an interval representation of an interpolated primitive in a motion blur interval, according to some embodiments.

In some embodiments that support motion blur, the graphics processor determines, per vertex, X, Y, and Z intervals for an interpolated triangle corresponding to the ray time within a motion blur interval. FIG. 4 is discussed in detail below and provides example techniques for generating an interval representation of an interpolated triangle. Generally, more detailed techniques for determining various specific intervals are discussed in detail below.

As discussed in detail below, data structures may represent triangles, moving triangles, triangle pairs, moving triangle pairs, or some combination thereof. In some embodiments, a triangle is represented using three vertices, a moving triangle is represented using six vertices, a triangle pair is represented using four vertices, and a moving triangle pair is represented using eight vertices.

In some embodiments, quantized triangle coordinates are stored as unsigned integer values of limited fixed-point precision and rounded toward zero. These coordinates may correspond to a local coordinate system recorded in an acceleration data structure ADS, e.g., as discussed in the '542 application. Quantized values may be N-bit values. In some embodiment, each coordinate value uses a number of bits that facilitates packing within a field of a certain size. As one example, 7-bit values per quantized coordinate interval value for a single triangle may be packed into two 64-bit fields (x upper/lower, y upper/lower, and z upper lower 7-bit values for each vertex for three vertices=126 bits). In other embodiments, fixed-point encodings using various appropriate numbers of bits may be utilized. In some embodiments, unsigned values are translated into a new coordinate frame in which values become signed integers. Note that in some situations, only one bound of an interval may be stored and the other bound may be implied. This may reduce storage requirements for certain parts of the processor.

In this context, if p is a quantized value for a triangle coordinate, the interval representing this coordinate in the local quantized coordinate space is $\bar{p}=[p, p+\delta p]$ where $\delta p$ represents one unit of least precision (ULP) in the quantized format, in some embodiments. The original coordinate value prior to quantization is guaranteed to lie within this interval. For an N-bit fixed-point representation, $$\delta p = \frac{1}{2^N}.$$

Generally, barred quantities discussed herein refer to intervals.

Therefore, a given non-moving triangle may be encoded using nine values (three vertices with three coordinate lower bounds for each vertex, with the upper bound implicitly one ULP larger than the lower bound).

In some embodiments, moving triangles are stored as two (or more) sets of coordinates, e.g., a position p(0) at time t=0 and a position p(1) at time t=1. This may define an interval of linear motion in the normalized temporal interval [0, 1]. Note that multiple linear movements during sub-intervals may also be used to encode non-linear movement over a larger motion blur interval. In this case, a moving triangle may include more than two sets of coordinates. A moving triangle coordinate at time t may be represented using the interval $\bar{p}(t)=[p(t), p(t)+\delta p]$.

In some embodiments, as part of low-precision intersection testing, the ray time is quantized to a lower-precision interval $\bar{t}=[t, t+\delta t]$ where t is encoded with M bits of sub-interval resolution (e.g., implicitly setting 1.0 at $2^M$). M may or may not correspond to the number of bits N used to represent spatial coordinates of the triangle (or the number of bits used to represent ray spatial coordinates). As with other quantized intervals, the original high-precision value is guaranteed to be found within the low-precision interval. Time is a fourth coordinate axis independent of other coordinates such as x, y, and z, in some embodiments.

Example Interval-Based Motion Blur Processing

In some embodiments, interval interpolation circuitry is configured to reconstruct conservative spatial intervals for moving triangle coordinates over a ray's quantized temporal interval $\bar{t}$. FIG. 4 is a block diagram illustrating example interpolation circuitry configured to generate an interval representation of an interpolated primitive within a motion blur interval, according to some embodiments. Circuitry 410 may perform the operations discussed above with reference to element 250 of FIG. 2B.

In the illustrated embodiment, interpolation circuitry 410 is configured to receive an interval representation of a ray time and an interval representation of a moving triangle (e.g., x, y, and z intervals for each of six vertices) and generate an interval representation of an interpolated triangle (e.g., x, y, and z intervals for each of three vertices).

As one example, circuitry 410 may determine the interpolated spatial coordinate interval as:

$$\overline{p(t)} = \overline{p(0)}(1.0 - \bar{t}) + \overline{p(0)}\bar{t}$$

Using the notation $p^0 = p(0)$ and $p^1 = p(1)$, circuitry 410 may determine an interpolated position coordinate interval $\overline{p(t)}$ that is guaranteed to cover the quantized temporal interval $[t, t+\delta t]$ for any $t \in [0, 1-\delta t]$ as:

$$\overline{p(t)} = [z, z + 2\delta p]$$

where $$z = p^0(1 - t - \delta t) + p^1 t$$

This equation may provide a good fit with reasonable performance and circuit area, in various embodiments. Further, it has been determined that the interval provided by this equation is conservative.

In some embodiments, circuitry 410 is configured to determine the $\overline{p(t)}$ interval according to this equation. Note that in other embodiments, other equations may be implemented by computer circuitry to determine conservative interpolated triangle intervals; the disclosed equations are included for purposes of illustration but are not intended to limit the scope of the present disclosure.

In various embodiments, the interpolated triangle interval may be tested using an initial low-precision intersection test, at least in motion blur modes of operation. Therefore, various primitive inputs discussed below may be for a traditional triangle or for an interpolated triangle, e.g., depending on whether motion blur is being utilized. Further, while various techniques discussed herein use interval arithmetic; disclosed interpolated triangle techniques for motion blur may be utilized with other quantized representations and techniques as well, e.g., the techniques of the '542 application.

Example Shear Factor Determination

As discussed in the '542 application, shear techniques may be used to implement an intersection test. In the following discussion, the following naming conventions are utilized:

P ray origin, floating-point object-space
p ray origin, fixed-point quantization space
D ray direction, floating-point object-space
$v^v$ triangle vertex coordinates, fixed-point quantization space In some embodiments, the transform to 2D sheared space is given by:

$$\begin{bmatrix} v'_x \\ v'_y \end{bmatrix} = \begin{bmatrix} 1 & 0 & -\frac{d_x}{d_z} & 0 \\ 0 & 1 & -\frac{d_y}{d_z} & 0 \end{bmatrix} \begin{bmatrix} 1 & 0 & 0 & -p_x \\ 0 & 1 & 0 & -p_y \\ 0 & 0 & 1 & -p_z \\ 0 & 0 & 0 & 1 \end{bmatrix} \begin{bmatrix} v_x \\ v_y \\ v_z \\ 1 \end{bmatrix} = \quad (1)$$

$$\begin{bmatrix} (v_x - p_x) - \frac{d_x}{d_z}(v_z - p_z) \\ (v_y - p_y) - \frac{d_y}{d_z}(v_z - p_z) \end{bmatrix}$$

In order to perform these calculations with fixed-point arithmetic, the device may convert object-space ray quantities P and D into quantization-space p and d as follows:

$$p = \frac{P_{v,i} - N_i}{S_i} = \frac{(P_i + vD_i) - N_i}{S_i} \forall i \in \{x, y, z\} \quad (2)$$

$$d_i = \frac{D_i}{S_i} \forall i \in \{x, y, z\} \quad (3)$$

Before proceeding further, the device may establish which axis of the scaled ray direction has the largest magnitude and rotate the axis names so that the longest axis is in the third place ("z"). Further, if this direction component is negative, the device may swap the other two axes in order to preserve handedness. For the following discussion, assume this renaming has been applied to all Cartesian quantities.

Substituting back into Equation 1 and simplifying gives:

$$\begin{bmatrix} v'_x \\ v'_y \end{bmatrix} = \begin{bmatrix} (v_x - p_x) - \frac{d_x}{d_z}(v_z - p_z) \\ (v_y - p_y) - \frac{d_y}{d_z}(v_z - p_z) \end{bmatrix} = \quad (4)$$

$$\begin{bmatrix} \left(v_x - \frac{(P_x + LD_x) - N_x}{S_x}\right) - \frac{D_x S_z}{D_z S_x}\left(v_z - \frac{(P_z + tD_z) - N_z}{S_z}\right) \\ \left(v_y - \frac{(P_y + tD_y) - N_y}{S_y}\right) - \frac{D_y S_z}{D_z S_y}\left(v_z - \frac{(P_z + tD_z) - N_z}{S_z}\right) \end{bmatrix}$$

In the context of disclosed interval techniques, various values represented in equation 4 are interval representations, as discussed above. Once in 2D shear-space, the ray position reduces to the origin of this coordinate frame, its direction aligned with the z axis, which the device may test against the three directed edges of the 2D triangle represented by the three sheared coordinates v'∈ {A', B', C'}, according to the following:

$$u = A'_x \cdot B'_y - A'_y \cdot B'_x$$

$$v = B'_x \cdot C'_y - B'_y \cdot C'_x$$

$$w = C'_x \cdot A'_y - C'_y \cdot A'_x$$

If all of u, v, w have the same sign, then the triangle covers the origin and the ray intersects the triangle, to within numerical precision.

Figure 5:
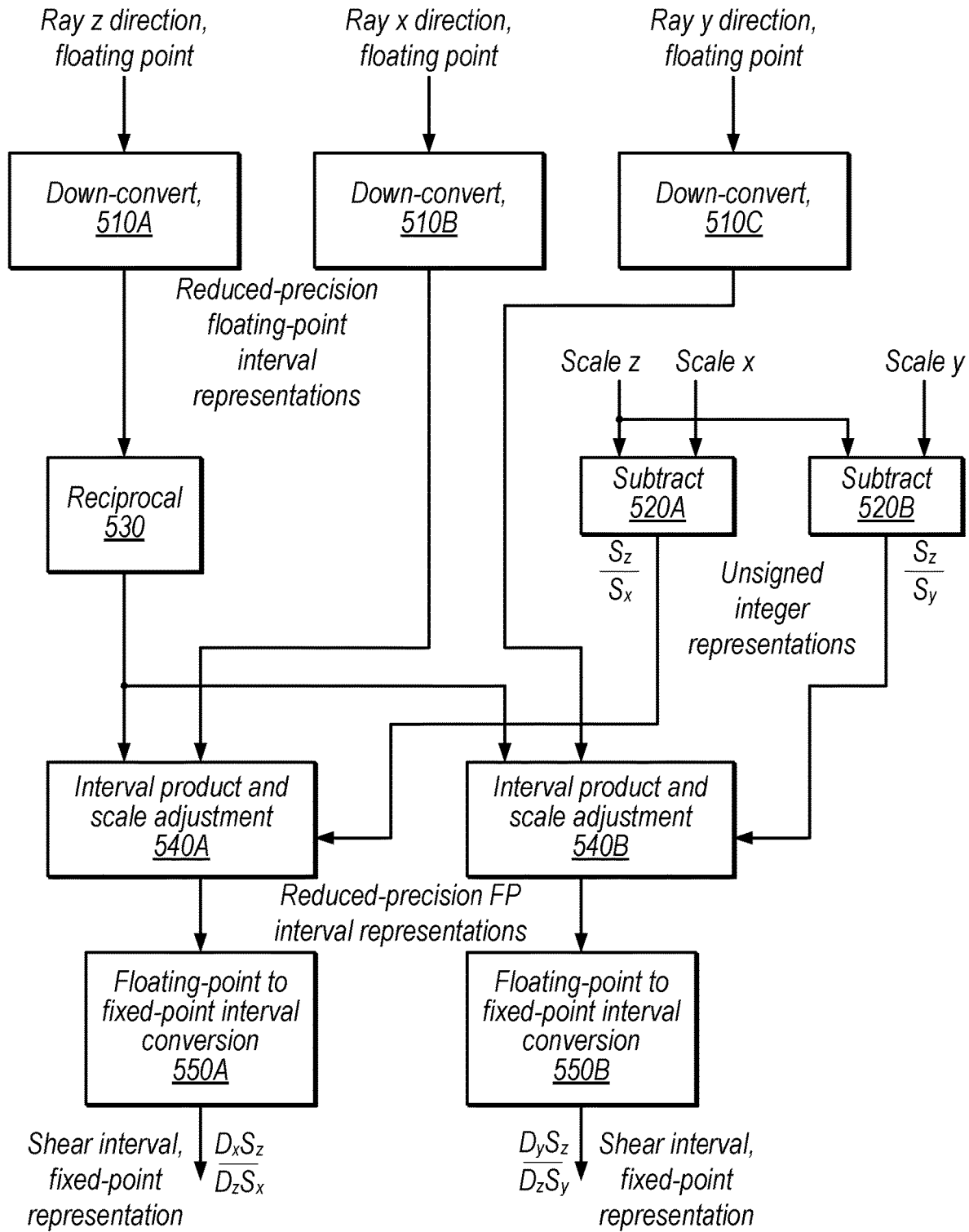
FIG. 5 is a block diagram illustrating example shear factor circuitry configured to generate shear factor intervals, according to some embodiments.

FIG. 5 is a block diagram illustrating example shear factor circuitry configured to generate shear factor intervals, according to some embodiments. In the illustrated embodiment, the shear factor circuitry (which may be included in low-precision test circuitry 220) includes down-convert circuits 510A-510C, subtract circuits 520A-520B, reciprocal circuit 530, interval product and scale adjustment circuits 540A-540B, and floating-point to fixed-point interval conversion circuits 550A-550B. In some embodiments, the circuitry of FIG. 5 implements the functionality of element 230 of FIG. 2B.

Down-convert circuits 510, in the illustrated embodiment, are configured to convert the x, y, and z directions (post-rotation, such that the longest axis is the z direction) to a reduced-precision floating-point interval representation. In some embodiments, the down-conversion rounds toward negative infinity (RTNI) to generate the lower interval bound and rounds toward positive infinity (RTPI) to generate the upper interval bound.

Subtract circuits 520, in the illustrated embodiment, are respectively configured to subtract the x and y scale values from the z scale value to generate unsigned division results for $S_z/S_x$ and $S_z/S_y$ in an unsigned integer representation. In some embodiments the scale values are powers of two such that subtraction of exponents corresponds to division. These scale factors may be determined based on the quantization frame for the primitive. Generally, a set of quantized values may share a "quantization frame" that defines parameters for the values. In some embodiments, quantized values are represented as fixed-point offsets relative to a common origin and scale factor. Therefore, the quantization frame may specify the origin (e.g., in x, y, and z coordinates) and scale factors (e.g., as power-of-2 scale factors for each of the z, y, and z dimensions). The quantized primitive intervals discussed herein may be represented using fixed-point coordinates that are interpreted in the context of the quantization frame. Note that the outputs of circuits 520 are not intervals in the illustrated example.

Reciprocal circuit 530, in the illustrated embodiment, is configured to generate a reciprocal of the down-converted z-direction value.

Interval product circuits and scale adjustment circuits 540, in the illustrated embodiment, are configured to perform an interval product operation on their inputs to generate outputs in a reduced-precision floating-point interval format. In some embodiments, circuits 540 are configured to clamp their outputs to the range [−1, 1]. In some embodiments, circuits 540 also apply the scaling from circuits 520 by using exponent adjustment to multiply by a power of two.

Floating-point to fixed-point interval conversion circuits 550, in the illustrated embodiment, are configured to convert the reduced-precision floating point interval representations to fixed-point interval representations for the $D_x S_z/D_z S_x$ and $D_y S_z/D_z S_y$ shear factors (which are input to the circuitry of FIG. 6 discussed below).

Figure 6:
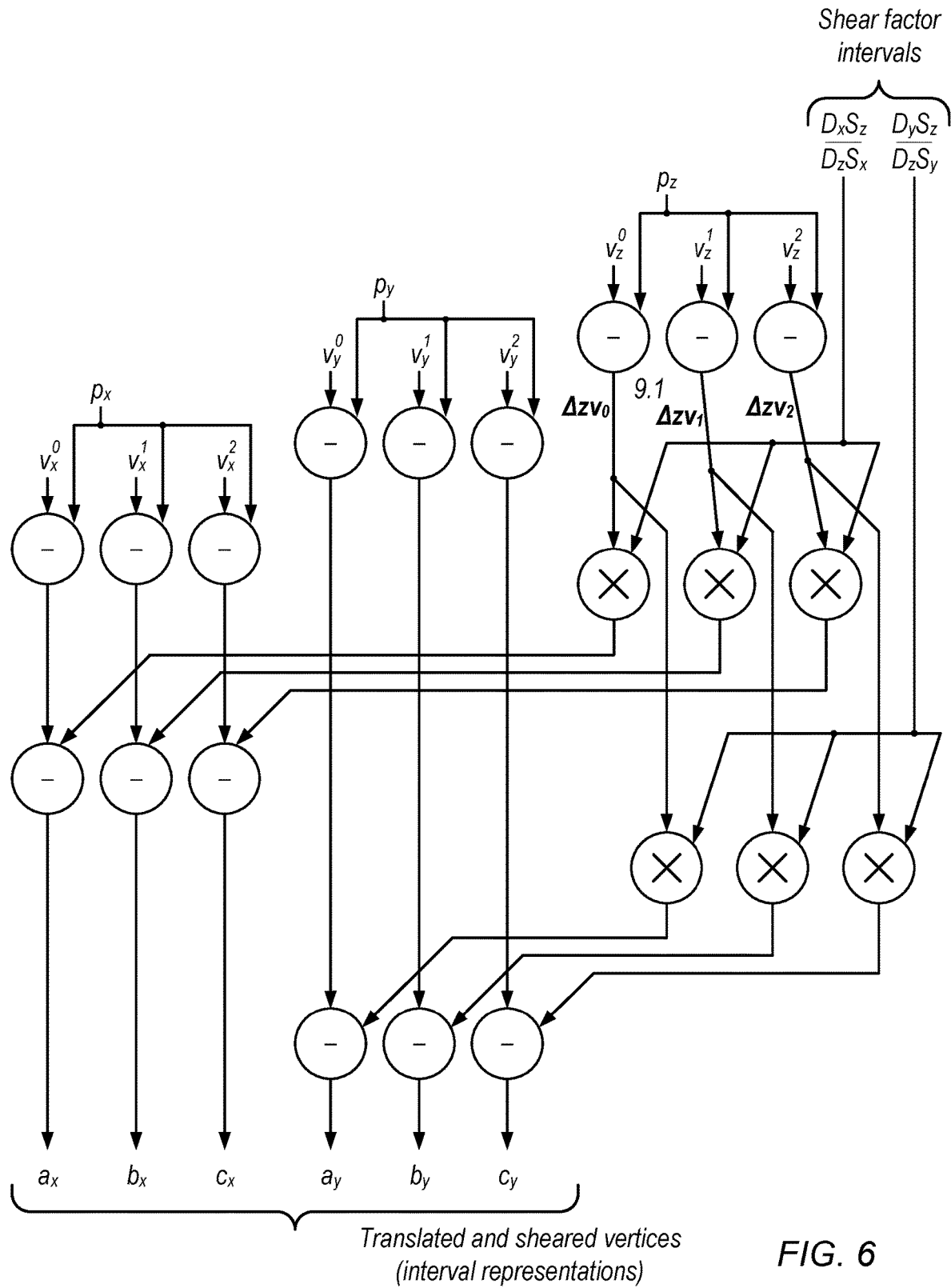
FIG. 6 is a diagram illustrating example circuitry configured to translate and shear vertices using shear factor intervals, according to some embodiments.

FIG. 6 is a diagram illustrating example circuitry configured to translate and shear vertices using shear factor intervals, according to some embodiments. For example, FIG. 6 may implement the operations of equation (4) above, using interval arithmetic. FIG. 6 may implement the operations discussed above with reference to element 260 of FIG. 2B. In the illustrated embodiment, the circuitry receives vertex and ray position data in interval form and is configured to perform interval subtraction and multiplication operations to generate translated and sheared vertices using the shear factor intervals generated by the circuitry of FIG. 5. In some embodiments, each of the outputs of FIG. 6 is an interval, the lower bound of which may be represented using a minus sign (e.g., $a_{y-}$) and the upper bound of which may be represented using a plus sign (e.g., $a_{y+}$) in FIG. 7.

Figure 7:
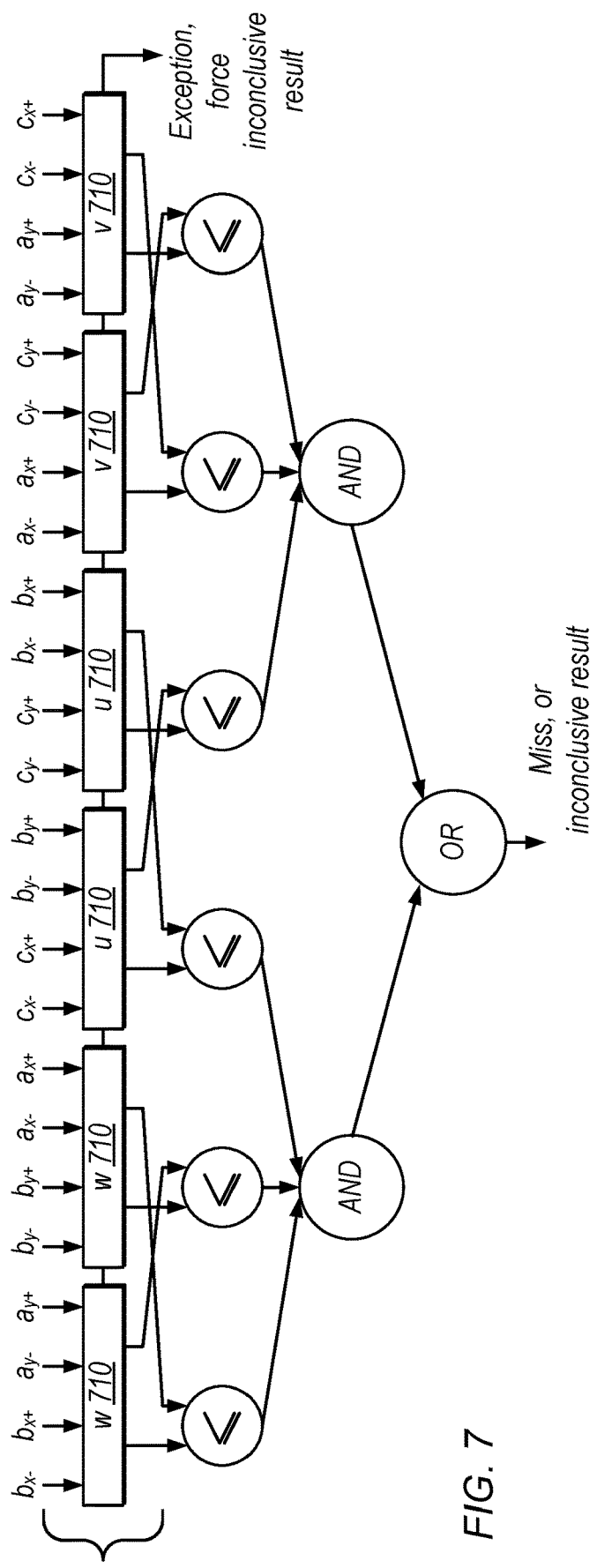
FIG. 7 is a circuit diagram illustrating example circuitry configured to generate an initial intersection test result, according to some embodiments.

FIG. 7 is a block diagram illustrating example circuitry configured to perform an initial, reduced-precision intersection test, according to some embodiments. In some embodiments, the circuitry of FIG. 7 implements the functionality of element 270 of FIG. 2B. For example, FIG. 7 may perform operations corresponding to the above equations for u, v, w to generate an intersection result, based on the outputs of FIG. 6. Note that the circuitry of FIG. 7 has some differences relative to those equations. First, this circuitry performs a comparison instead of a subtraction (e.g., $A'_x \cdot B'_y < A'_y \cdot B'_x$ instead of $A'_x \cdot B'_y - A'_y \cdot B'_x$) because the sign is all that is needed. Second, the circuitry of FIG. 7 performs twice as many multiplies, in the illustrated embodiment, to provide a conservative test (e.g., only considering the "outer" part of the edge interval) but the circuitry does not know which way is "out" because it may be considering the clockwise or counter-clockwise face of the triangle. Circuits 710 are configured to generate a modified interval product and are discussed in detail below with reference to FIG. 8.

The illustrated AND and OR logic of FIG. 7 provides a result that indicates whether the reduced-precision test provides a conclusive miss. As shown, the six two-sided edge tests may use 12 multipliers and 6 comparators, all fixed-point. Note that various circuitry may be combined or merged, for example adders and subtractors may be implemented by a single component that performs both operations in parallel and multipliers and comparators may be merged to implement a single ab<=cd operation.

As discussed above, the processor may perform a higher-precision intersection test (e.g., using the original floating-point representation) if there is an inconclusive result (a potential hit).

Example Modified Interval Product

Normally a signed interval product requires four multipliers, as it is defined: $[x_1, x_2] \cdot [y_1, y_2] = [\min(x_1y_1, x_1y_2, x_2y_1, x_2y_2), \max(x_1y_1, x_1y_2, x_2y_1, x_2y_2)]$. In some embodiments, the interval product is implemented using two multipliers. To fully resolve the sign of the interval sum-of-products, we need to accurately resolve the sign of both endpoints to each interval product. This can be done with only two multipliers per interval product, except when both interval inputs to the interval product span the origin. In this instance, the hardware may raise an exception, and the intersection test may record a potential hit. Empirical data shows this is exception case may be rare under typical workloads. Code Listing 1 implements a modified signed interval product using only two hardware multipliers.

```
// Begin Code Listing 1: Modified Signed Interval Product
template <typename T>
struct Interval {
    T lower, upper;
    inline Interval (const T& 1, const T& u) : lower (1), upper (u) { }
};
// T is assumed to be a signed integer (int8_t, int16_t, int32_t,
      int64_t)
// Exception is raised in the case where four multipliers are needed to
      resolve
// the sign of both end points of the interval - in all other cases
      signs are
// fully resolved.
template <typename T>
Interval<T> intervalProduct (Interval<T> a, Interval<T> b, bool&
      exception) {
    uint8_t bit0_AB = a.upper >= 0;
    uint8_t bit1_AB = a.lower >= 0;
    uint8_t bit2_AB = b.upper >= 0;
    uint8_t bit3_AB = b.lower >= 0;
    uint8_t code_AB = (bit3_AB << 3) | (bit2_AB << 2) | (bit1_AB << 1) |
      bit0_AB;
    Interval<T> p = { 0, 0 } ;
    switch (code_AB) {
      case 0xf: p.upper = a.upper * b.upper; p.lower = a.lower *
           b.lower; break;
      case 0xd: p.upper = a.upper * b.upper; p.lower = a.lower *
           b.upper; break;
      case 0xc: p.upper = a.upper * b.lower; p.lower = a.lower *
           b.upper; break;
      case 0x7: p.upper = a.upper * b.lower; p.lower = a.upper *
           b.lower; break;
      case 0x5:
         p.upper = std::numeric_limits<T>::max ( ) ;
         p.lower = std::numeric_limits<T>::lowest ( ) ;
         exception = true;
         break; // failure case - too close to call, need 4 multipliers
      case 0x4: p.upper = a.lower * b.lower; p.lower = a.lower *
           b.upper; break;
      case 0x3: p.upper = a.lower * b.upper; p.lower = a.upper *
```

```
            b.lower; break;
        case 0x1: p.upper = a.lower * b.lower; p.lower = a.upper *
            b.lower; break;
        case 0x0: p.upper = a.lower * b.lower; p.lower = a.upper *
            b.upper; break;
    }
    return p;
}
```

Figure 8:
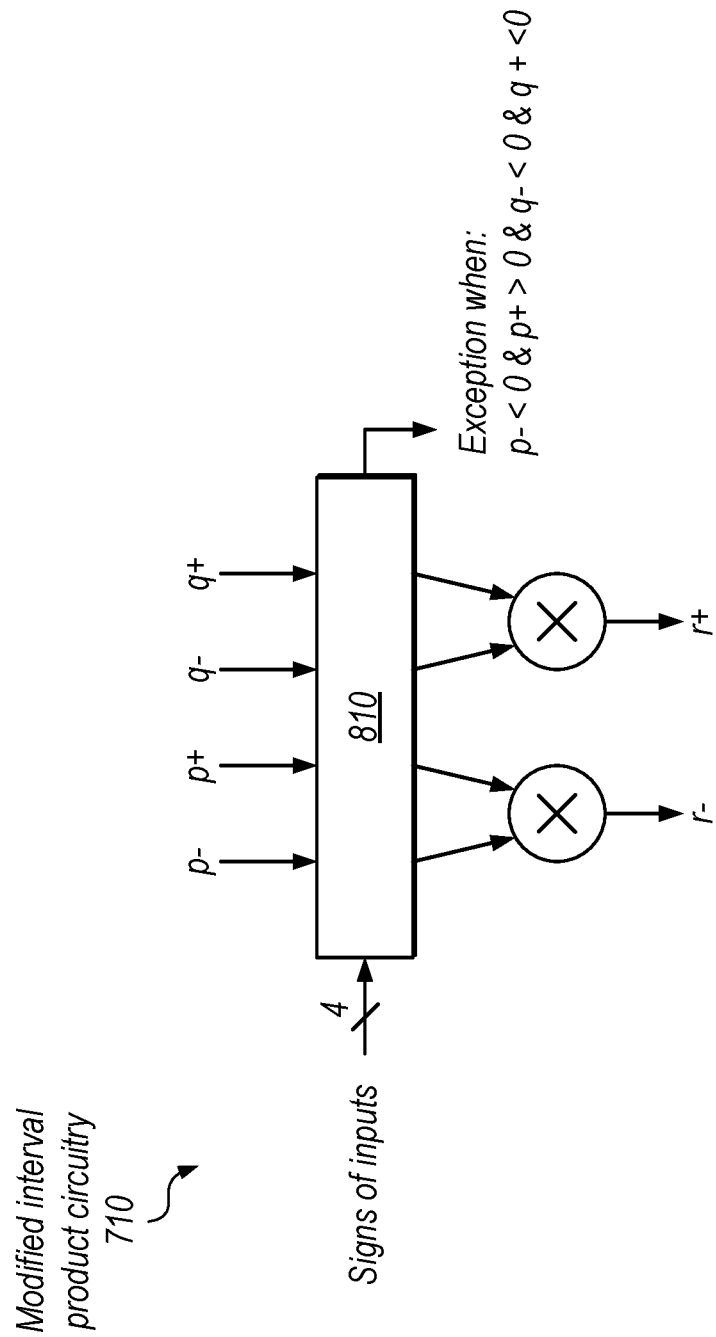
FIG. 8 is a diagram illustrating example circuitry configured to generate a modified interval product, according to some embodiments.

FIG. 8 shows one example of circuitry 810 configured to implement the modified signed interval product, according to some embodiments. In some embodiments, the circuitry of FIG. 8 is included in respective elements 710 of FIG. 7. In this embodiment, the routing circuitry 810 is configured by the four signs of the inputs to route operands to two multipliers, e.g., as set out in code listing 1. Circuitry 810 is also configured to detect an exception condition, in this example.

Example Encoding and Processing Techniques for Triangle Pairs

Figure 9:
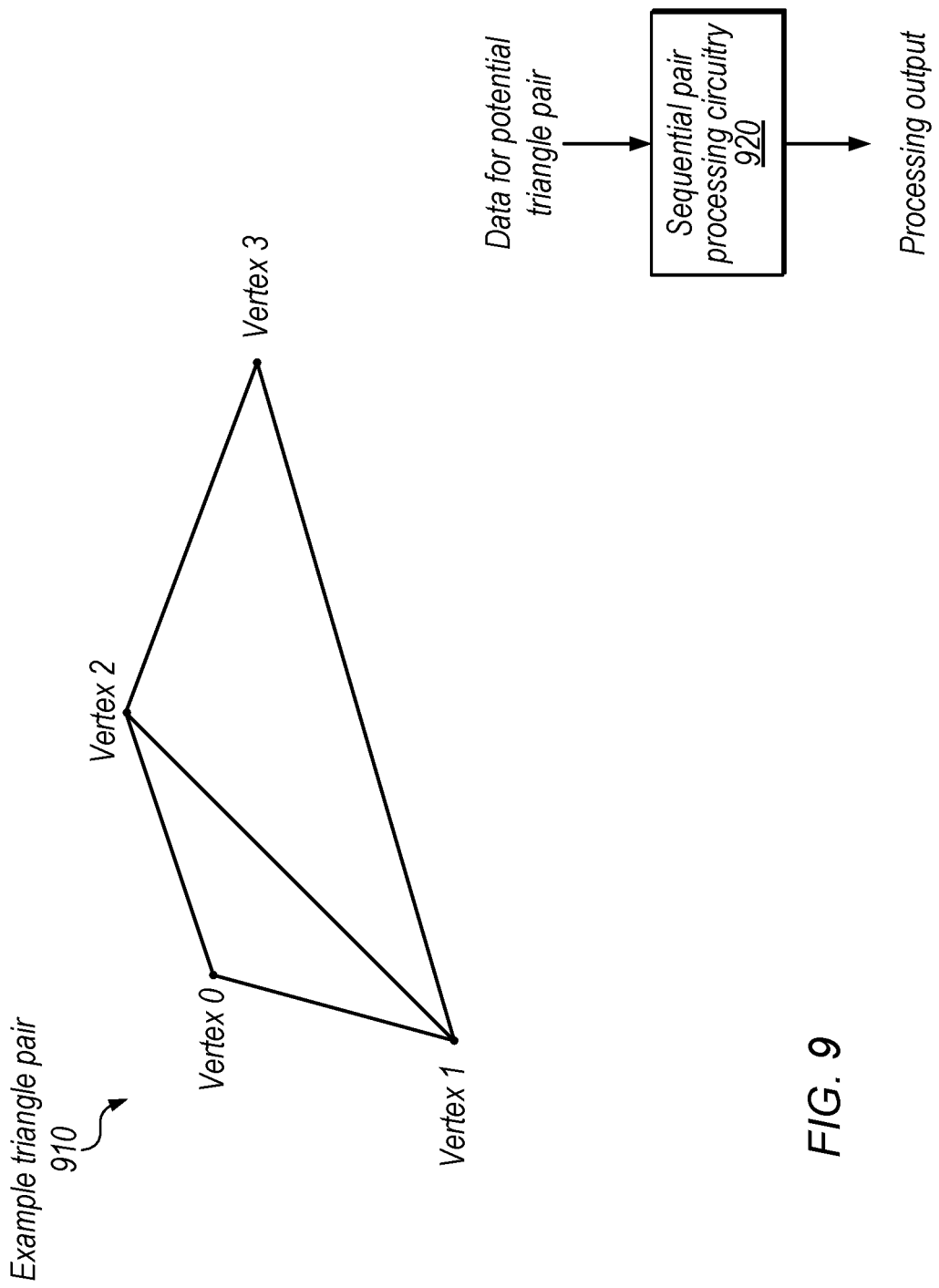
FIG. 9 is a diagram illustrating an example triangle pair and sequential pair processing circuitry, according to some embodiments.

FIG. 9 is a diagram illustrating an example triangle pair and sequential pair processing circuitry, according to some embodiments. As shown, triangle pair 910 is a set of two triangles that shares two vertices (vertex 1 and vertex 2, in the illustrated example). Therefore, the two triangles can be defined by four vertices. Given that triangle pairs are common in various models, in some embodiments the processor is configured to store triangles using a triangle pair data structure with four vertices, which may reduce storage requirements.

In some embodiments, the processor includes sequential pair processing circuitry 920 configured to perform one or more operations on a triangle pair sequentially, e.g., processing one triangle in a pair before processing the second triangle in a pair. The operation may be an initial intersection result, as one example, but other circuitry may use similar sequential techniques. This may provide efficient processing in implementations where the same triangle-pair structure is used for all triangles, but some structures may have data for only a single triangle. In these embodiments, sequential pair processing circuitry 920 may skip operations for the second triangle in a pair, if the data structure indicates that only one triangle is encoded.

Example Definitive Hit Detection Using Lower-Precision Intersection Test

In some embodiments, intersection test circuitry that operates on quantized inputs may still provide definitive information regarding whether a line corresponding to the ray intersects a primitive, which may be useful for certain types of rays. Therefore, referring back to the example of FIG. 7, modified comparison circuitry may be implemented (in addition to or in place of the circuitry of FIG. 7) to provide a result that indicates either a conclusive hit or that it is inconclusive whether a hit occurred.

FIG. 10 is a diagram illustrating example regions enclosed by a quantized representation of a two-dimensional triangular primitive (e.g., post-shear). In the illustrated example, edges 1010 show the precise edges, e.g., if represented according to the original precision. Outer bounds 1020 and inner bounds 1030 show the bounds of the quantized representation, e.g., using an interval representation.

As shown, a ray falling in the region outside bounds 1020 is a conclusive miss, e.g., as detectable by the circuitry of FIG. 7. A ray falling in the region between bounds 1020 and 1030 is inconclusive (e.g., because it is unknown precisely where the triangle edges fall within this region). Rays falling in this region may require a higher-precision test.

As shown, a ray falling in the region within bounds 1030 is a conclusive hit for a line corresponding to the ray. Note that an intersection detected by this test may not indicate precisely where the hit occurred, e.g., due to the quantization. Further, the intersection detected by this test may only indicate a hit on the line corresponding to the ray, e.g., due the quantization of the interval over which the ray is valid.

In some embodiments, however, determining a definitive hit in the region within bounds 1030 may be useful, even with the limitations discussed above.

Figure 12:
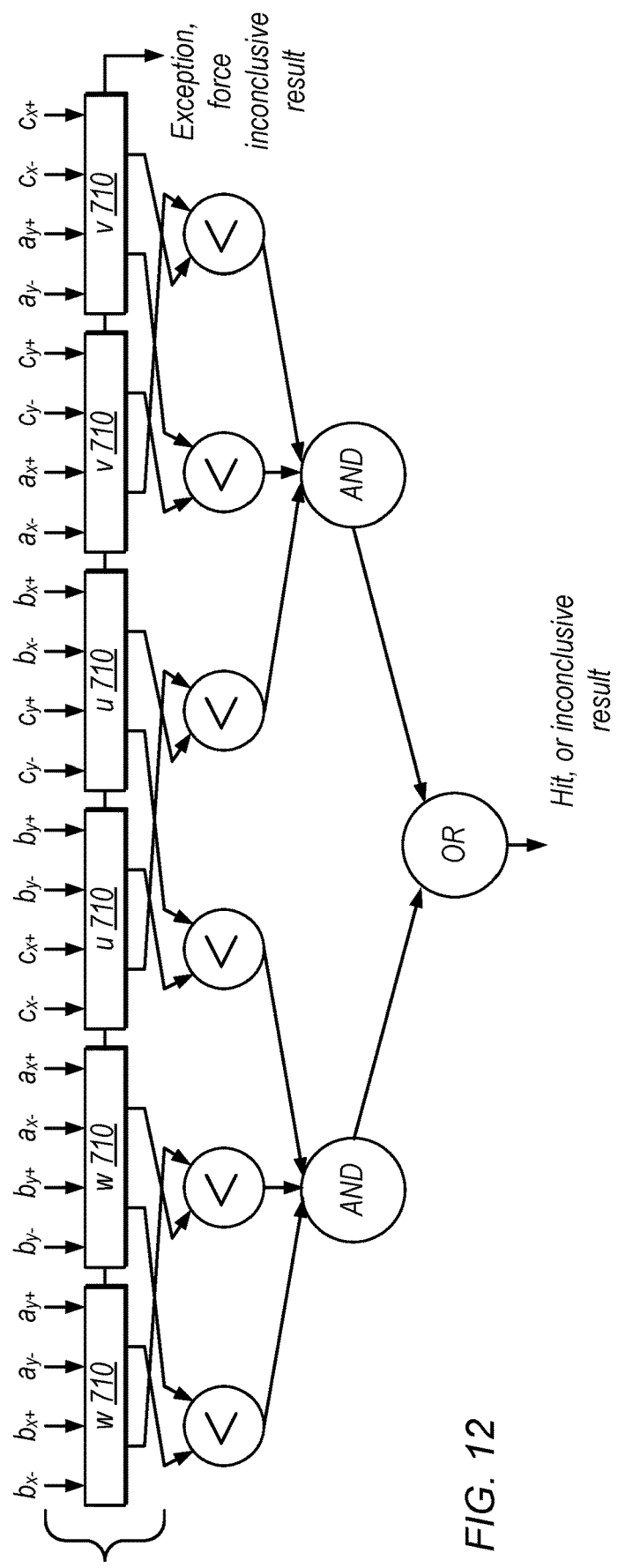
FIG. 12 is a circuit diagram illustrating example circuitry configured to generate an initial intersection test result, according to some embodiments.

FIG. 11 is a block diagram illustrating example low-precision test circuitry 1120 configured to indicate whether there is a hit or if it is inconclusive whether there is a hit. FIG. 12, discussed in detail below, provides one detailed example of such circuitry. Note that circuitry 1120 may also provide an output that indicates whether there is a miss or if it is inconclusive if there is a miss, e.g., if combining the circuitry of FIG. 7 and FIG. 12.

In some embodiments, the processor may skip a higher-precision intersection test in some scenarios where the output of circuitry 1120 indicates a definitive hit. In some embodiments, such a ray query may be terminated under the following conditions: the ray is an any-hit ray, the triangle is opaque, and the active ray interval fully covers at least one bounding volume that fully encloses this triangle. The triangle opacity may be determined based on whether an alpha maps to the test, in some embodiments. Whether the active ray interval fully covers at least one bounding volume that fully encloses the triangle may be determined based on traversal of the ADS (which allows a determination of which bounding volumes fully enclose the triangle based on the structure of the ADS) and slab test circuitry configured to test bounding volumes for the traversal.

Under these conditions, the processor may record a ray-triangle intersection hit without performing a higher-precision test. This may advantageously improve performance, reduce power consumption, or both, when processing any-hit rays. Note that the conditions discussed above are included for purposes of illustration; in other embodiments only a subset of these conditions may be checked, other conditions may be imposed, etc.

FIG. 12 is a circuit diagram similar to the diagram of FIG. 7 that shows definitive hit test circuitry, according to some embodiments. In the illustrated embodiment, circuitry 710 is configured as described above with reference to FIGS. 7 and 8. The outputs are routed to comparators differently, however, to provide a hit or inconclusive result. In some embodiments, the comparators, AND gates, and OR gate shown in FIG. 12 are included in addition to the circuitry shown in FIG. 7 such that the quantized intersection test circuitry outputs two Boolean results for a given test.

Code listing 2 below provides example operations that may be implemented by the circuitry of FIG. 12 or other similar circuitry.

```
// Begin Code Listing 2: Edge Tests and Comparators
// 12 multipliers for the 6 interval products
bool intervalProductExceptionFlag = false;
Interval W_bx_ay = interval_product (bxInterval, ayInterval,
   intervalProductExceptionFlag) ;
Interval W_by_ax = interval_product (byInterval, axInterval,
   intervalProductExceptionFlag) ;
Interval U_cx_by = interval_product (cxInterval, byInterval,
   intervalProductExceptionFlag) ;
Interval U_cy_bx = interval_product (cyInterval, bxInterval,
   intervalProductExceptionFlag) ;
Interval V_ax_cy = interval_product (axInterval, cyInterval,
   intervalProductExceptionFlag) ;
Interval V_ay_cx = interval_product (ayInterval, cxInterval,
   intervalProductExceptionFlag) ;
// Inside/Outside Determination
// Handle back and front face possibilities
// Determine a guaranteed miss (successful rejection of ray-triangle
   intersection)
const bool outerEdgeTestSigns FrontU = U_cy_bx.upperlower < U_cx_by.upper;
const bool outerEdgeTestSigns FrontV = V_ay_cx.upperlower < V_ax_cy.upper;
const bool outerEdgeTestSignsFrontW = W_by_ax.upperlower < W_bx_ay.upper;
const bool outerEdgeTestSignsBackU = U_cx_by.upperlower < U_cy_bx.upper;
const bool outerEdgeTestSignsBackV = V_ax_cy.upperlower < V_ay_cx.upper;
const bool outerEdgeTestSignsBackW = W_bx_ay.upperlower < W_by_ax.upper;
const bool insideOuterBackfacingTriangle = outerEdgeTestSignsBackU &&
   outerEdgeTestSignsBackV && outerEdgeTestSignsBackW;
const bool insideOuterFrontfacingTriangle = outerEdgeTestSigns FrontU &&
   outerEdgeTestSigns FrontV && outerEdgeTestSigns FrontW;
const bool guaranteedRayMiss = ! insideOuterBackfacingTriangle &&
   !insideOuterFrontfacingTriangle;
// Determine a guaranteed hit (successful accept of line-triangle
   intersection)
const bool innerEdgeTestSignsFrontU = U_cy bx.upper <= U_cx by.upperlower;
const bool innerEdgeTestSignsFrontV = V_ay_cx.upper <= V_ax_cy.upperlower;
const bool innerEdgeTestSignsFrontW = W_by_ax.upper <= W_bx_ay.upperlower;
const bool innerEdgeTestSignsBackU = U_cx by.upper <= U_cy_bx.upperlower;
const bool innerEdgeTestSignsBackV = V_ax cy.upper <= V_ay_cx.upperlower;
const bool innerEdgeTestSignsBackW = W_bx_ay.upper <= W_by_ax.upperlower;
const bool insideInnerBackfacingTriangle = innerEdgeTestSignsBackU &&
   innerEdgeTestSignsBackV && innerEdgeTestSignsBackW;
const bool insideInnerFrontfacingTriangle = innerEdgeTestSigns FrontU &&
   innerEdgeTestSigns FrontV && innerEdgeTestSigns FrontW;
const bool guaranteedLineHit = insideInnerBackfacingTriangle | |
   insideInnerFrontfacingTriangle;
if (intervalProductExceptionFlag) return TRIANGLE_FILTER_INCONCLUSIVE;
else if (guaranteedRayMiss) return
   TRIANGLE_FILTER_CONSERVATIVE_RAY_MISS;
else if (guaranteedLineHit) return
   TRIANGLE_FILTER_CONSERVATIVE_LINE_HIT;
else return TRIANGLE_FILTER_INCONCLUSIVE;
```

Example Traversal Techniques to Potentially Reduce Intersection Tests

Ray intersection calculations are often facilitated by acceleration data structures (ADS's). To efficiently implement ray intersection queries, a spatial data structure may reduce the number of ray-surface intersection tests and thereby accelerate the query process. A common class of ADS is the bounding volume hierarchy (BVH) in which surface primitives are enclosed in a hierarchy of geometric proxy volumes (e.g., boxes) that are cheaper to test for intersection. These volumes may be referred to as bounding regions. By traversing the data structure and performing proxy intersection tests along the way, the graphics processor locates a conservative set of candidate intersection primitives for a given ray. A common form of BVH uses 3D Axis-Aligned Bounding Boxes (AABB). Once constructed, an AABB BVH may be used for all ray queries, and is a viewpoint-independent structure. In some embodiments, these structures are constructed once for each distinct mesh in a scene, in the local object space or model space of that object, and rays are transformed from world-space into the local space before traversing the BVH. This may allow geometric instancing of a single mesh with many rigid transforms and material properties (analogous to instancing in rasterization). Animated geometry typically requires the data structure to be rebuilt (sometimes with a less expensive update operation known as a "refit"). For non-real-time use cases, in which millions or billions of rays are traced against a single scene in a single frame, the cost of ADS construction is fully amortized to the point of being "free." In a real-time context, however, there is typically a delicate trade-off between build costs and traversal costs, with more efficient structures typically being more costly to build.

In some embodiments intersection circuitry is configured to traverse a BVH ADS that uses 3D axis-aligned boxes for its bounding volumes. The ADS may have a maximum branching factor (e.g., 2, 4, 8, 16, etc.) and a flexible user-defined payload (e.g., the contents at the leaves of the tree) that does not presume triangle geometry. In some embodiments, a depth-first search is performed, e.g., as discussed in U.S. patent application Ser. No. 17/103,317 filed on Nov. 24, 2020, which is incorporated by reference herein in its entirety.

In some embodiments, RIA 190 is configured to use a modified ordering of child nodes for a given node for certain types of depth-first traversals. In some embodiments, disclosed techniques are applied to secondary rays. Secondary rays are rays that proceed from the location of an intersection between a first (already traced) ray and a surface. Many any-hit rays are secondary rays due the types of effects that are commonly implemented with any-hit rays (e.g., shadows). Secondary rays therefore originate near the intersected surface and point away from the surface (and therefore do not intersect that particular surface).

Because of the nature of secondary rays, the present inventor(s) have recognized that front-to-back or back-to-front traversals of child nodes for intersected bounding volumes may typically result in intersection tests that are misses. For front-to-back, for example, the ray is likely to intersect a bounding volume for the primitive that reflected the secondary ray (triggering an intersection test), but will not actually intersect that primitive.

Figure 13:
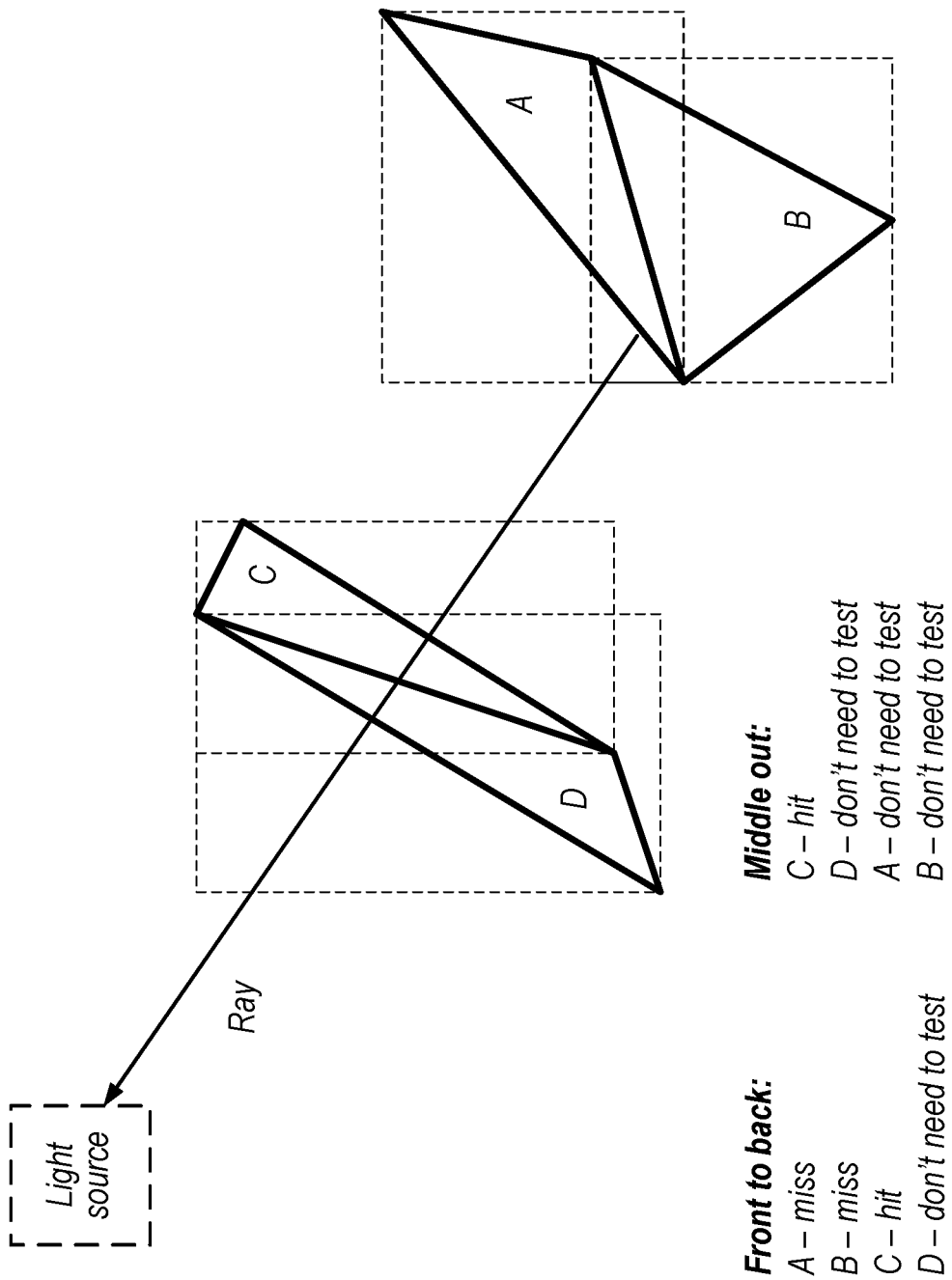
FIG. 13 is a diagram illustrating example primitive testing sequences according to different orderings, including a middle-out ordering, according to some embodiments.

FIG. 13 is a diagram comparing a front-to-back ordering to a middle-out ordering for intersected child nodes of an acceleration data structure, according to some embodiments. In the illustrated example, a secondary ray is a reflection based on an intersection of another ray (not shown) with primitive A. As shown, the ray ends at a light source (this may be due to ray tracing typically tracing rays backwards from the camera to the light source to avoid processing irrelevant rays). The ray is an any-hit ray and intersects primitive C, in this example.

Consider an example situation where the ray intersects the bounding volumes for each illustrated primitive and the illustrated primitives are all child nodes of a node corresponding to a larger bounding volume. In this example, traversal circuitry may use various orderings of child nodes to pursue first in a depth-first search.

As shown, using a front-to-back ordering in which bounding volumes closer to the ray origin are traversed first, intersections tests for primitives A and B result in misses before a hit is eventually detected for primitive C and the query ends (because this is an any-hit ray). The miss for primitive A is unsurprising, given the intersection of the ray that spawned the illustrated secondary ray with primitive A.

Using a middle-out ordering advantageously provides a quicker hit detection, which requires two fewer intersection tests relative to the front-to-back ordering in this example. As shown, starting at the middle of the ray results in a hit for primitive C and the query can end without testing primitives D, A, or B.

Various techniques may be utilized to provide preferential ordering to one or more middle nodes relative to front/back nodes, in some embodiments. As one example, consider a tree-like ADS with a branching factor N. The intersection circuitry may first sort child nodes whose bounding volumes were intersected in front-to-back order. For M≤N intersected children (indexed 0 to M−1), the intersection circuitry may reorder the intersections via the following sequences, depending on whether M is odd or even.

If M is odd and division means whole integer division (e.g., 3/2=1), the following is an example reordered sequence of child indices:

M/2
M/2+1
M/2−1
M/2+2
M/2−2
. . .
M/2+M/2=M−1
M/2−M/2=0

If M is even, the following is an example reordered sequence:

M/2
M/2−1
M/2+1
M/2−2
M/2+2
. . .
M/2+(M/2−1)=M−1
M/2−M/2=0

In some hardware implementations, for a maximum branching factor N, the circuitry may encode reordering sequences for each value of M from 1 to N in order to quickly determine the order for a middle-out traversal. As one non-limiting example, if N=8 then a table might include the following sequences:

For M=1:[0]
For M=2:[1, 0]
For M=3:[1, 2, 0]
For M=4:[2, 1, 3, 0]
For M=5:[2, 3, 1, 4, 0]
For M=6:[3, 2, 4, 1, 5, 0]
For M=7:[3, 4, 2, 5, 1, 6, 0]
For M=8:[4, 3, 5, 2, 6, 1, 7, 0]

Note that the specific sequences discussed herein are included for purposes of illustration but are not intended to limit the scope of the present disclosure. In other embodiments, various orderings may be implemented in which one or more inner child nodes are prioritized over front/back nodes.

In embodiments that use binary trees (N=2), the traversal circuitry may alternate between back-to-front and front-to-back traversal orderings when searching child nodes of different levels of the tree (e.g., using front-to-back for odd depths in the tree and back-to-front for even depths in the tree or vice versa).

Example Methods

FIG. 14 is a flow diagram illustrating an example method for performing an initial intersection test, according to some embodiments. The method shown in FIG. 14 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1410, in the illustrated embodiment, a graphics processor quantizes a first representation of a primitive to generate a reduced-precision interval representation of the primitive, wherein the interval representation includes interval values that are guaranteed to cover corresponding values specified by the first representation of the primitive. In some embodiments, the quantization of the first representation of the primitive uses a fixed-point quantized representation rounded toward zero for a lower bound of the interval and the lower bound plus one unit of least precision (ULP) for an upper bound of the interval.

At 1420, in the illustrated embodiment, the graphics processor quantizes a first representation of a ray to generate a reduced-precision interval representation of the ray, wherein the interval representation includes interval values that are guaranteed to cover corresponding values specified by the first representation of the ray. In some embodiments, the reduced-precision interval representation of the ray includes a quantized ray time represented as an interval. In some embodiments, circuitry generates, based on first and second positions of the primitive at different points within a motion blur time interval, the reduced-precision interval representation of the primitive, such that the reduced-precision interval representation of the primitive covers all possible locations of the primitive during the interval representing the quantized ray time.

At 1430, in the illustrated embodiment, the graphics processor determines, using interval arithmetic, an initial intersection result based on coordinates of the interval representation of the primitive with coordinates of the interval representation of the ray, wherein a miss indicated by the initial intersection result is guaranteed not to be a hit for the first representation of the primitive and first representation of the ray.

In some embodiments, in response to a potential hit initial intersection result, the graphics processor is configured to perform an intersection test using the first representation of the primitive and the first representation of the ray.

In some embodiments, shear factor circuitry generates interval representations of shear factors based on ray direction information and scale information and sheared vertex intervals based on the quantized representation of the primitive and the interval representation of the shear factors. In some embodiments, the initial intersection result is based on the sheared vertex intervals. In some embodiments, the shear factor circuitry is configured to use: a first precision to represent a first coordinate for an origin of the ray in a coordinate direction providing a threshold (e.g., greatest) contribution to a ray direction vector (e.g., the axis renamed to the z-direction) and a second, greater precision to represent coordinates for the origin of the ray in other directions.

In some embodiments, the first representation of the primitive is a representation of a triangle pair that includes at most four vertices for two triangular primitives in the triangle pair, wherein the graphics processor includes circuitry configured to process triangles of a given triangle pair sequentially.

FIG. 15 is a flow diagram illustrating an example method for performing an initial intersection test, according to some embodiments. The method shown in FIG. 15 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1510, in the illustrated embodiment, a graphics processor performs intersection tests, where the intersection tests operate on reduced-precision representations of rays that were generated by quantizing initial representations of the rays and reduced-representatives of primitives that were generated by quantizing initial representations of the primitives. In the illustrated embodiment, the intersection tests generate a first result for a first ray and a first primitive wherein the first result indicates that first ray intersects the first primitive, according to their initial representations. In some embodiments, the intersection tests may also generate a second result for a second ray and the first primitive wherein the second result indicates that it is inconclusive whether the second ray intersects the first primitive. The graphics processor may perform an intersection test for the second ray using the initial representation of the second ray and the first primitive. The intersection tests may be performed based on traversal of an acceleration data structure that includes hierarchically-arranged bounding volumes for a at least a portion of a graphics scene.

At 1520, in the illustrated embodiment, the graphics processor records an intersection with the first primitive for the first ray based on the first result, without performing an intersection test for the first ray using the initial representation of the first ray and the first primitive. In the illustrated embodiment, the intersection is recorded based on: the first result, a determination that the first primitive is opaque, and a determination that there is at least one bounding volume in the acceleration data structure that encloses the entirety of the first primitive and for which the entirety of the enclosed portion of the first ray is active.

In some embodiments, the graphics processor is configured to record the intersection for the first ray based on an any-hit query for the first ray (and may not record definitive intersection results based on reduced-precision tests for other types of queries).

In some embodiments, test circuitry is further configured to output a result for the first ray and the first primitive that indicates either: the first ray missed the first primitive, according to their initial representations or it is inconclusive whether the first ray misses the first primitive. For example, the processor may include the comparator and logic circuitry of both FIGS. 7 and 12. For the first ray and first primitive, in the example discussed above, this output will indicate that it is inconclusive whether the first ray misses the first primitive, because the other output indicated a definitive hit.

In some embodiments, the processor uses a middle-out traversal order for at least some types of rays. In some embodiments, the processor is configured to perform the intersection tests based on traversal (e.g., by traversal circuitry) of an acceleration data structure that includes nodes corresponding to hierarchically arranged bounding volumes. In particular, the processor may perform a depth-first search of the acceleration data structure and, for a set of child nodes of a first node in the acceleration data structure, select a next node for the depth-first search according to an ordering of intersected bounding regions for the set of child nodes, where the ordering begins with a bounding volume that is closer to a mid-point of a ray being tested than one or more front bounding volumes and one or more back bounding volumes.

In some embodiments the processor determines, prior to determination of the ordering, the number of nodes in the set of child nodes, where the set of child nodes corresponds to nodes that are respectively intersected by the ray being tested. For example, the processor may access a lookup table to determine the ordering once the number of intersected child nodes is determined. In some embodiments, the ray being tested is an any-hit ray and traversal for the ray being tested ends in response to detection of an intersection. In some embodiments, relative to a starting node, the ordering alternates for subsequent nodes in the ordering between nodes in a front direction and nodes in a back direction. As used herein, a node that is closer to the "front" of a ray is closer to the end of the ray and a node that is closer to the "back" of a ray is closer to the origin of the ray. The example orderings discussed above with reference to FIG. 13 are examples of alternating between nodes in a front direction and nodes in a back direction, starting from a middle node.

Example Device

Figure 16:
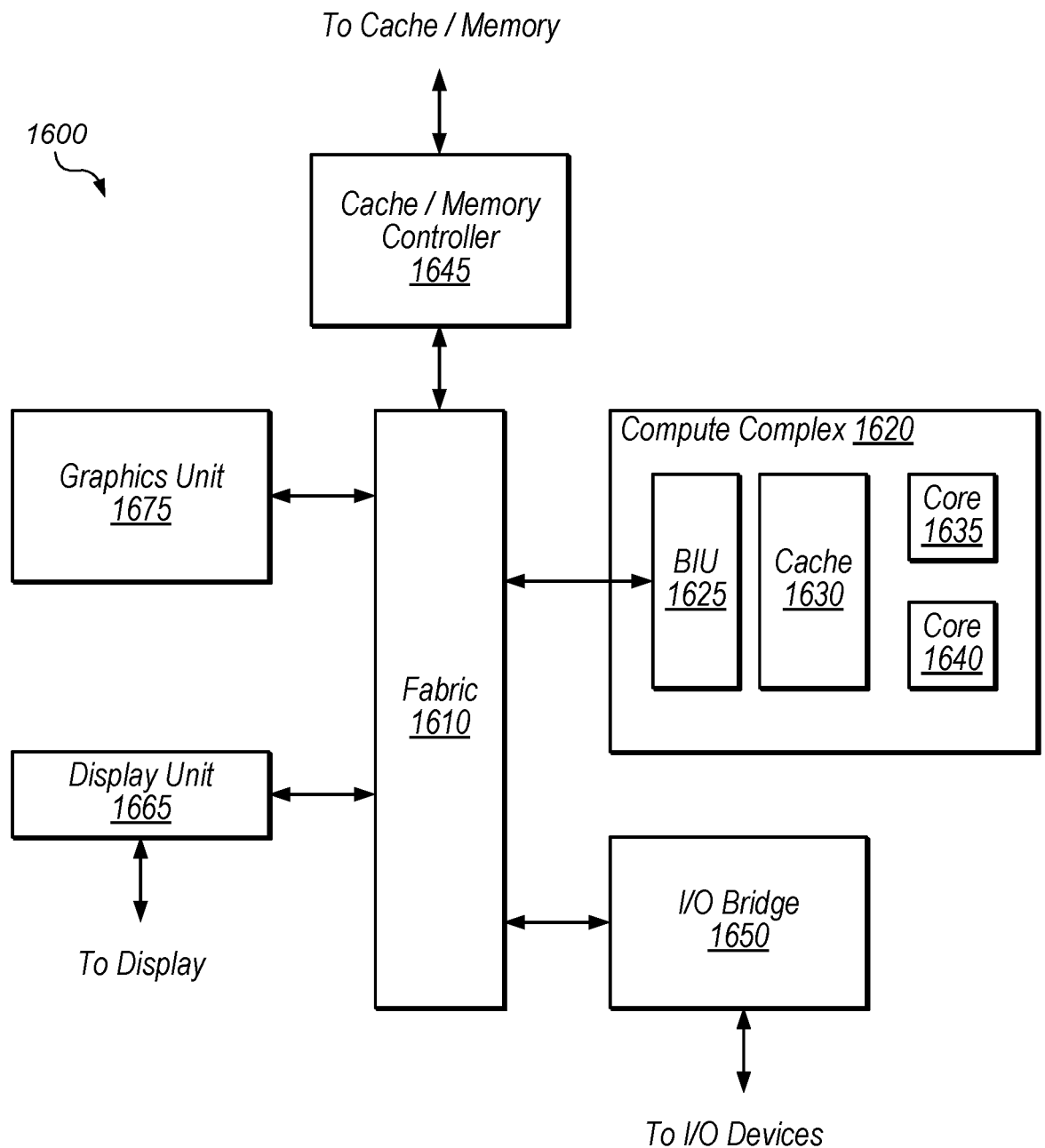
FIG. 16 is a block diagram illustrating an example computing device, according to some embodiments.

Referring now to FIG. 16, a block diagram illustrating an example embodiment of a device 1600 is shown. In some embodiments, elements of device 1600 may be included within a system on a chip. In some embodiments, device 1600 may be included in a mobile device, which may be battery-powered. Therefore, power consumption by device 1600 may be an important design consideration. In the illustrated embodiment, device 1600 includes fabric 1610, compute complex 1620 input/output (I/O) bridge 1650, cache/memory controller 1645, graphics unit 1675, and display unit 1665. In some embodiments, device 1600 may include other components (not shown) in addition to or in place of the illustrated components, such as video processor encoders and decoders, image processing or recognition elements, computer vision elements, etc.

Fabric 1610 may include various interconnects, buses, MUX's, controllers, etc., and may be configured to facilitate communication between various elements of device 1600. In some embodiments, portions of fabric 1610 may be configured to implement various different communication protocols. In other embodiments, fabric 1610 may implement a single communication protocol and elements coupled to fabric 1610 may convert from the single communication protocol to other communication protocols internally.

In the illustrated embodiment, compute complex 1620 includes bus interface unit (BIU) 1625, cache 1630, and cores 1635 and 1640. In various embodiments, compute complex 1620 may include various numbers of processors, processor cores and caches. For example, compute complex 1620 may include 1, 2, or 4 processor cores, or any other suitable number. In one embodiment, cache 1630 is a set associative L2 cache. In some embodiments, cores 1635 and 1640 may include internal instruction and data caches. In some embodiments, a coherency unit (not shown) in fabric 1610, cache 1630, or elsewhere in device 1600 may be configured to maintain coherency between various caches of device 1600. BIU 1625 may be configured to manage communication between compute complex 1620 and other elements of device 1600. Processor cores such as cores 1635 and 1640 may be configured to execute instructions of a particular instruction set architecture (ISA) which may include operating system instructions and user application instructions.

Cache/memory controller 1645 may be configured to manage transfer of data between fabric 1610 and one or more caches and memories. For example, cache/memory controller 1645 may be coupled to an L3 cache, which may in turn be coupled to a system memory. In other embodiments, cache/memory controller 1645 may be directly coupled to a memory. In some embodiments, cache/memory controller 1645 may include one or more internal caches.

As used herein, the term "coupled to" may indicate one or more connections between elements, and a coupling may include intervening elements. For example, in FIG. 16, graphics unit 1675 may be described as "coupled to" a memory through fabric 1610 and cache/memory controller 1645. In contrast, in the illustrated embodiment of FIG. 16, graphics unit 1675 is "directly coupled" to fabric 1610 because there are no intervening elements.

Graphics unit 1675 may include one or more processors, e.g., one or more graphics processing units (GPU's). Graphics unit 1675 may receive graphics-oriented instructions, such as OPENGL®, Metal, or DIRECT3D® instructions, for example. Graphics unit 1675 may execute specialized GPU instructions or perform other operations based on the received graphics-oriented instructions. Graphics unit 1675 may generally be configured to process large blocks of data in parallel and may build images in a frame buffer for output to a display, which may be included in the device or may be a separate device. Graphics unit 1675 may include transform, lighting, triangle, and rendering engines in one or more graphics processing pipelines. Graphics unit 1675 may output pixel information for display images. Graphics unit 1675, in various embodiments, may include programmable shader circuitry which may include highly parallel execution cores configured to execute graphics programs, which may include pixel tasks, vertex tasks, and compute tasks (which may or may not be graphics-related).

In some embodiments, graphics unit 1175 includes circuitry 220, which may reduce power consumption, increase performance, or both, relative to traditional GPUs.

Display unit 1665 may be configured to read data from a frame buffer and provide a stream of pixel values for display. Display unit 1665 may be configured as a display pipeline in some embodiments. Additionally, display unit 1665 may be configured to blend multiple frames to produce an output frame. Further, display unit 1665 may include one or more interfaces (e.g., MIPI® or embedded display port (eDP)) for coupling to a user display (e.g., a touchscreen or an external display).

I/O bridge 1650 may include various elements configured to implement: universal serial bus (USB) communications, security, audio, and low-power always-on functionality, for example. I/O bridge 1650 may also include interfaces such as pulse-width modulation (PWM), general-purpose input/output (GPIO), serial peripheral interface (SPI), and inter-integrated circuit (I2C), for example. Various types of peripherals and devices may be coupled to device 1600 via I/O bridge 1650.

In some embodiments, device 1600 includes network interface circuitry (not explicitly shown), which may be connected to fabric 1610 or I/O bridge 1650. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 1600 with connectivity to various types of other devices and networks.

Example Applications

Figure 17:
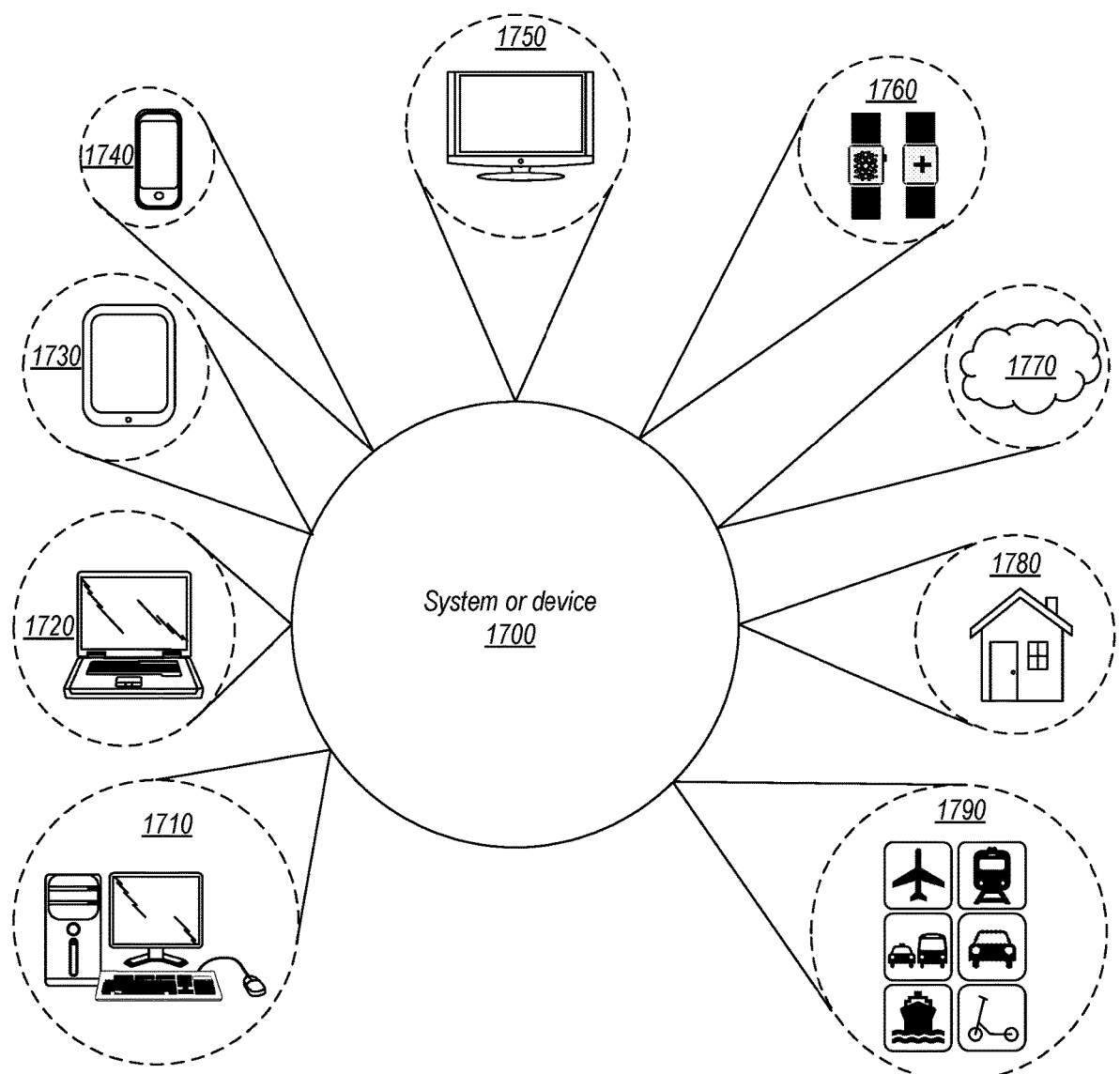
FIG. 17 is a diagram illustrating example applications of disclosed systems and devices, according to some embodiments.

Turning now to FIG. 17, various types of systems that may include any of the circuits, devices, or system discussed above. System or device 1700, which may incorporate or otherwise utilize one or more of the techniques described herein, may be utilized in a wide range of areas. For example, system or device 1700 may be utilized as part of the hardware of systems such as a desktop computer 1710, laptop computer 1720, tablet computer 1730, cellular or mobile phone 1740, or television 1750 (or set-top box coupled to a television).

Similarly, disclosed elements may be utilized in a wearable device 1760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1700 may also be used in various other contexts. For example, system or device 1700 may be utilized in the context of a server computer system, such as a dedicated server or on shared hardware that implements a cloud-based service 1770. Still further, system or device 1700 may be implemented in a wide range of specialized everyday devices, including devices 1780 commonly found in the home such as refrigerators, thermostats, security cameras, etc. The interconnection of such devices is often referred to as the "Internet of Things" (IoT). Elements may also be implemented in various modes of transportation. For example, system or device 1700 could be employed in the control systems, guidance systems, entertainment systems, etc. of various types of vehicles 1790.

The applications illustrated in FIG. 17 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 18:
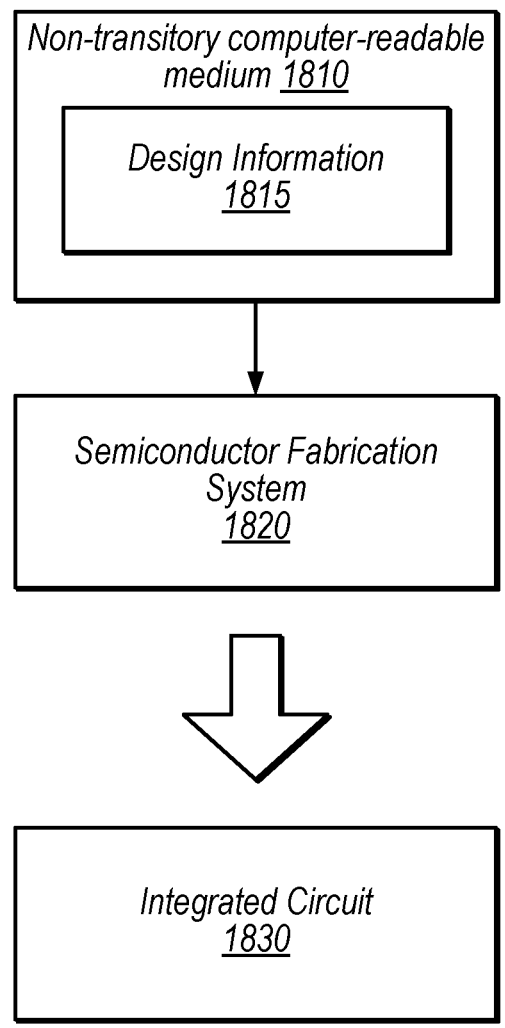
FIG. 18 is a block diagram illustrating an example computer-readable medium that stores circuit design information, according to some embodiments.

FIG. 18 is a block diagram illustrating an example non-transitory computer-readable storage medium that stores circuit design information, according to some embodiments. In the illustrated embodiment semiconductor fabrication system 1820 is configured to process the design information 1815 stored on non-transitory computer-readable medium 1810 and fabricate integrated circuit 1830 based on the design information 1815.

Non-transitory computer-readable storage medium 1810, may comprise any of various appropriate types of memory devices or storage devices. Non-transitory computer-readable storage medium 1810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1810 may include other types of non-transitory memory as well or combinations thereof. Non-transitory computer-readable storage medium 1810 may include two or more memory mediums which may reside in different locations, e.g., in different computer systems that are connected over a network.

Design information 1815 may be specified using any of various appropriate computer languages, including hardware description languages such as, without limitation: VHDL, Verilog, SystemC, SystemVerilog, RHDL, M, MyHDL, etc. Design information 1815 may be usable by semiconductor fabrication system 1820 to fabricate at least a portion of integrated circuit 1830. The format of design information 1815 may be recognized by at least one semiconductor fabrication system 1820. In some embodiments, design information 1815 may also include one or more cell libraries which specify the synthesis, layout, or both of integrated circuit 1830. In some embodiments, the design information is specified in whole or in part in the form of a netlist that specifies cell library elements and their connectivity. Design information 1815, taken alone, may or may not include sufficient information for fabrication of a corresponding integrated circuit. For example, design information 1815 may specify the circuit elements to be fabricated but not their physical layout. In this case, design information 1815 may need to be combined with layout information to actually fabricate the specified circuitry.

Integrated circuit 1830 may, in various embodiments, include one or more custom macrocells, such as memories, analog or mixed-signal circuits, and the like. In such cases, design information 1815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1820 may also be configured to perform various testing of fabricated circuits for correct operation.

In various embodiments, integrated circuit 1830 is configured to operate according to a circuit design specified by design information 1815, which may include performing any of the functionality described herein. For example, integrated circuit 1830 may include any of various elements shown in FIGS. 1B, 2, 4-9, 11, 12, and 16. Further, integrated circuit 1830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
    test circuitry configured to:
        perform an intersection test based on traversal of an acceleration data structure that includes hierarchically-arranged bounding volumes for a graphics scene, wherein:
            the intersection test operates on:
                reduced-precision representations of rays that are quantized versions of initial representations of the rays; and
                reduced-precision representations of primitives that are quantized versions of initial representations of the primitives; and
            the intersection test generates a first result for a first ray and a first primitive that indicates that a line coincident with the first ray definitively intersects the first primitive; and
    graphics processing circuitry configured to record an intersection for the first ray with the first primitive, based on the first result, without performing an intersection test for the first ray using the initial representation of the first ray and the first primitive.

2. The apparatus of claim 1, wherein the graphics processing circuitry is further configured to record the intersection based on a determination that there is at least one bounding volume in the acceleration data structure that encloses the entirety of the first primitive and for which the entirety of an enclosed portion of the first ray is active.

3. The apparatus of claim 2, wherein the graphics processing circuitry is further configured to record the intersection based on a determination that the first primitive is opaque.

4. The apparatus of claim 1, wherein the graphics processing circuitry is further configured to record the intersection based on a determination that a query for the first ray is an any-hit query.

5. The apparatus of claim 1, wherein the test circuitry is further configured to output a result for a given ray and a given primitive that indicates either:

the given ray missed the given primitive, according to their initial representations; or
it is inconclusive whether the given ray missed the given primitive.

6. The apparatus of claim 1, further comprising:
    traversal circuitry configured to traverse the acceleration data structure including to:
        perform a depth-first search of the acceleration data structure; and
        for a set of child nodes of a first node in the acceleration data structure, select a next node for the depth-first search according to an ordering of intersected bounding regions for the set of child nodes, wherein the ordering begins with a bounding volume that is closer to a mid-point of a ray being tested than one or more front bounding volumes and one or more back bounding volumes.

7. The apparatus of claim 6, wherein the traversal circuitry is configured to determine, prior to determination of the ordering, the number of nodes in the set of child nodes that are intersected by the ray being tested.

8. The apparatus of claim 7, wherein, to determine the ordering, the traversal circuitry is configured to sort the set of child nodes by distance from an origin of the first ray and then re-sort the sorted set of child nodes to a middle-out ordering based on a lookup table.

9. The apparatus of claim 6, wherein the ray being tested is an any-hit, secondary ray and traversal for the ray being tested ends in response to detection of an intersection.

10. The apparatus of claim 6, wherein, relative to a starting node at a median of a distance-sorted list of nodes, the ordering alternates between nodes in a front direction and nodes in a back direction.

11. The apparatus of claim 1, further comprising:
    traversal circuitry configured to traverse the acceleration data structure including to:
        perform a depth-first search of the acceleration data structure, wherein at least a portion of the acceleration data structure is a binary tree; and
        alternate between front-to-back and back-to-front orderings when searching child nodes of different levels of the binary tree.

12. The apparatus of claim 1,
    wherein the intersection tests further generate a second result for a second ray and the first primitive wherein the second result indicates that it is inconclusive whether the second ray intersects the first primitive; and
    wherein the graphics processing circuitry is further configured to perform an intersection test for the second ray using the initial representation of the second ray and the first primitive.

13. The apparatus of claim 1, wherein the test circuitry includes six modified interval product circuits, six comparators, and combinational logic configured to generate the first result.

14. The apparatus of claim 1, wherein the apparatus is a computing device that further includes:
    a central processing unit;
    a display; and
    network interface circuitry.

15. A method, comprising:
    performing, by a computing system, an intersection test based on traversal of an acceleration data structure that includes hierarchically-arranged bounding volumes for a graphics scene, wherein:

the intersection test operates on:
reduced-precision representations of rays that are quantized versions of initial representations of the rays; and
reduced-precision representations of primitives that are quantized versions of initial representations of the primitives; and
the intersection test generates a first result for a first ray and a first primitive that indicates that a line coincident with the first ray definitively intersects the first primitive; and recording, by the computing system, an intersection for the first ray with the first primitive, based on the first result, without performing an intersection test for the first ray using the initial representation of the first ray and the first primitive.

16. The method of claim 15, wherein the recording is further based on determining that there is at least one bounding volume in the acceleration data structure that encloses the entirety of the first primitive and for which the entirety of an enclosed portion of the first ray is active.

17. The method of claim 15, further comprising:
performing, by the computing system, a depth-first search of the acceleration data structure; and
for a set of child nodes of a first node in the acceleration data structure, selecting a next node for the depth-first search according to an ordering of intersected bounding regions for the set of child nodes, wherein the ordering begins with a bounding volume that is closer to a mid-point of a ray being tested than one or more front bounding volumes and one or more back bounding volumes.

18. The method of claim 17, further comprising determining the ordering by sorting the set of child nodes by distance from an origin of the first ray and then re-sorting the sorted set of child nodes to a middle-out ordering.

19. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
test circuitry configured to:
perform an intersection test based on traversal of an acceleration data structure that includes hierarchically-arranged bounding volumes for a graphics scene, wherein:
the intersection test operates on:
reduced-precision representations of rays that are quantized versions of initial representations of the rays; and
reduced-precision representations of primitives that are quantized versions of initial representations of the primitives; and
the intersection test generates a first result for a first ray and a first primitive that indicates that a line coincident with the first ray definitively intersects the first primitive; and
graphics processing circuitry configured to record an intersection for the first ray with the first primitive, based on the first result, without performing an intersection test for the first ray using the initial representation of the first ray and the first primitive.

20. The non-transitory computer readable storage medium of claim 19, wherein design information specifies that graphics processing circuitry is further configured to record the intersection based on a determination that there is at least one bounding volume in the acceleration data structure that encloses the entirety of the first primitive and for which the entirety of an enclosed portion of the first ray is active.

* * * * *